US012574076B2

(12) United States Patent
Liu et al.

(10) Patent No.: US 12,574,076 B2
(45) Date of Patent: Mar. 10, 2026

(54) ANTENNA SHARING BETWEEN RADIO ACCESS TECHNOLOGIES

(71) Applicant: QUALCOMM Incorporated, San Diego, CA (US)

(72) Inventors: Kangqi Liu, San Diego, CA (US); Seyedkianoush Hosseini, San Diego, CA (US); Jing Jiang, San Diego, CA (US); Gene Fong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 18/193,941

(22) Filed: Mar. 31, 2023

(65) Prior Publication Data

US 2024/0333343 A1      Oct. 3, 2024

(51) Int. Cl.
*H04B 7/0404*      (2017.01)
*H04W 8/24*      (2009.01)
*H04W 88/06*      (2009.01)

(52) U.S. Cl.
CPC ............ *H04B 7/0404* (2013.01); *H04W 8/24* (2013.01); *H04W 88/06* (2013.01)

(58) Field of Classification Search
CPC ........................ H04B 7/0404; H04W 72/1215; H04W 72/51; H04W 8/24; H04W 88/06
USPC ...................................................... 455/552.1
See application file for complete search history.

(56) References Cited

U.S. PATENT DOCUMENTS

| | | | | |
|---|---|---|---|---|
| 2013/0329665 A1* | 12/2013 | Kadous | ................ | H04L 5/0007 |
| | | | | 370/329 |
| 2019/0394765 A1* | 12/2019 | Saxena | ................ | H04W 72/51 |
| 2020/0037383 A1* | 1/2020 | Rico Alvarino | .. | H04W 72/0453 |
| 2021/0092687 A1* | 3/2021 | Harrison | ............ | H04L 25/0226 |
| 2024/0172104 A1* | 5/2024 | Qin | ...................... | H04B 7/0802 |

FOREIGN PATENT DOCUMENTS

| | | |
|---|---|---|
| WO | WO-2013188561 A1 | 12/2013 |
| WO | WO-2014163750 A1 | 10/2014 |
| WO | WO-2020028366 A1 | 2/2020 |

OTHER PUBLICATIONS

International Search Report and Written Opinion—PCT/US2024/019504—ISA/EPO—Jun. 25, 2024.

* cited by examiner

*Primary Examiner* — Hirdepal Singh
(74) *Attorney, Agent, or Firm* — QUALCOMM Incorporated

(57)      ABSTRACT

Methods, systems, and devices for wireless communications are described. Techniques described herein provide for a user equipment (UE) to share unused antennas dedicated or configured for a one radio access technology (RAT) for communications with a network entity of another RAT. The UE may communicate, via a first set of antennas using a first RAT. The UE may also communicate, via a second set of antennas, using a second RAT. To share the one or more antennas dedicated or configured for the second RAT, the UE may transmit, to the network entity of the first RAT, an indication of a capability to switch the second set of antennas from the second RAT to the first RAT. The UE may communicate with the network entity of the first RAT via the first set of antennas and via the second set of antennas.

29 Claims, 16 Drawing Sheets

300

320

410

Time Slots <u>405</u>

Report Type one <u>415</u>

Report Type two <u>420</u>

400

710

720

715

705

700

1110

1120

1115

1105

1100

130

105

115

Network
Entity

Transceiver

1410

Antenna

1415

Communications
Manager

1420

Memory

Code

1430

1425

1440

Processor

1435

1405

1400

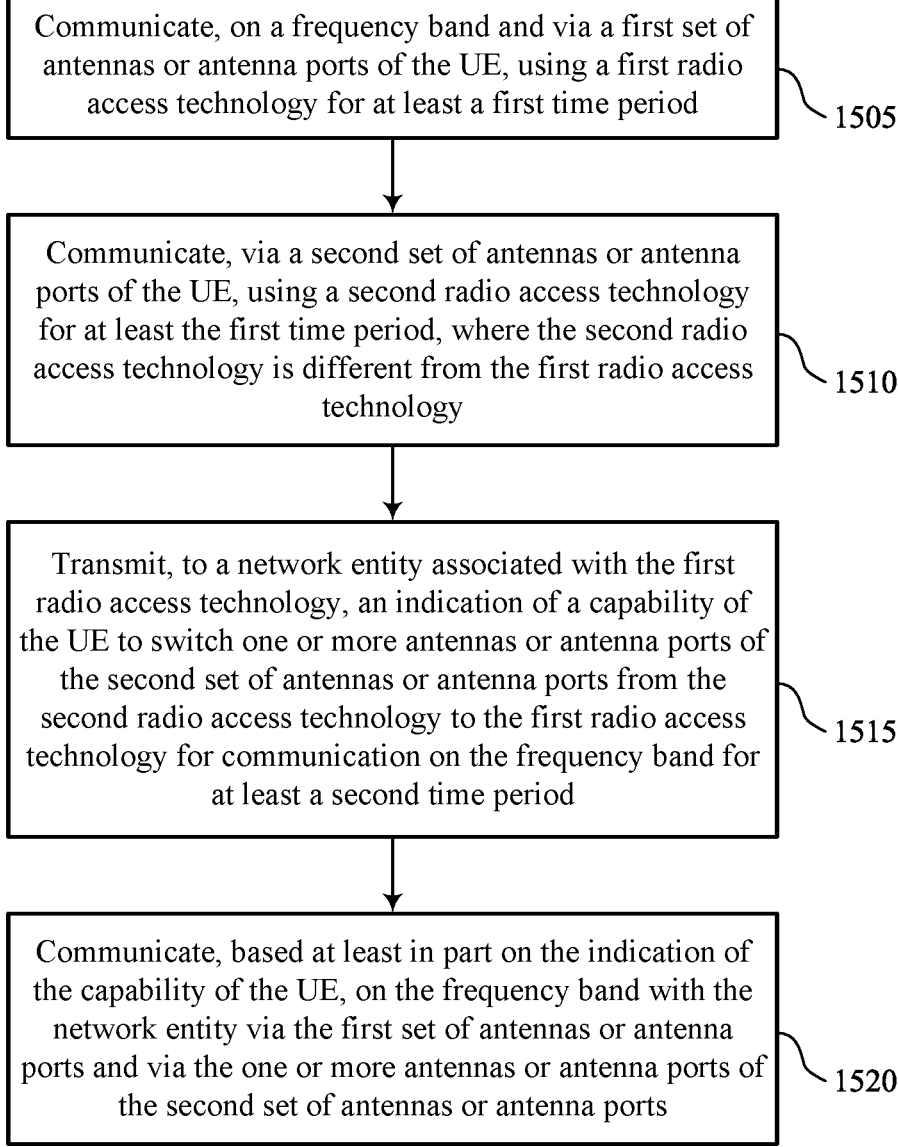

Communicate, on a frequency band and via a first set of antennas or antenna ports of the UE, using a first radio access technology for at least a first time period

1505

Communicate, via a second set of antennas or antenna ports of the UE, using a second radio access technology for at least the first time period, where the second radio access technology is different from the first radio access technology

1510

Transmit, to a network entity associated with the first radio access technology, an indication of a capability of the UE to switch one or more antennas or antenna ports of the second set of antennas or antenna ports from the second radio access technology to the first radio access technology for communication on the frequency band for at least a second time period

1515

Communicate, based at least in part on the indication of the capability of the UE, on the frequency band with the network entity via the first set of antennas or antenna ports and via the one or more antennas or antenna ports of the second set of antennas or antenna ports

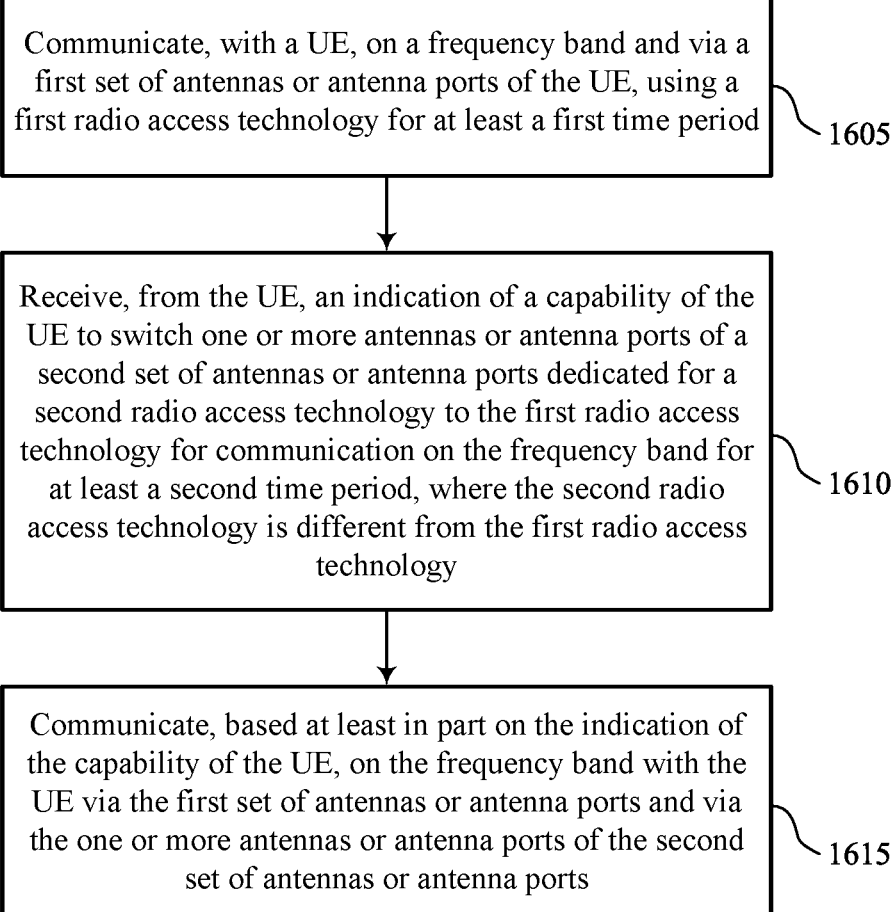

Communicate, with a UE, on a frequency band and via a first set of antennas or antenna ports of the UE, using a first radio access technology for at least a first time period — 1605

Receive, from the UE, an indication of a capability of the UE to switch one or more antennas or antenna ports of a second set of antennas or antenna ports dedicated for a second radio access technology to the first radio access technology for communication on the frequency band for at least a second time period, where the second radio access technology is different from the first radio access technology — 1610

Communicate, based at least in part on the indication of the capability of the UE, on the frequency band with the UE via the first set of antennas or antenna ports and via the one or more antennas or antenna ports of the second set of antennas or antenna ports — 1615

ANTENNA SHARING BETWEEN RADIO ACCESS TECHNOLOGIES

FIELD OF TECHNOLOGY

The following relates to wireless communications, including antenna sharing between radio access technologies.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support antenna sharing between radio access technologies (RATs). For example, the described techniques provide for a user equipment (UE) to share unused antennas or antenna ports dedicated or configured for one RAT for communications with a network entity of another RAT. The UE may communicate, via a first set of antennas or antenna ports of the UE using a first RAT. The UE may also communicate, via a second set of antennas or antenna ports of the UE, using a second RAT. To share the antennas or antenna ports dedicated or configured for the second RAT, the UE may transmit, to the network entity of the first RAT, an indication of a capability to switch one or more of the second set of antennas or antenna ports from the second RAT to the first RAT for communication on the frequency band. The UE may communicate with the network entity of the first RAT via the first set of antennas or antenna ports and via the one or more of the second set of antennas or antenna ports.

A method for wireless communications at a user equipment (UE) is described. The method may include communicating, on a frequency band and via a first set of antennas or antenna ports of the UE, using a first radio access technology for at least a first time period, communicating, via a second set of antennas or antenna ports of the UE, using a second radio access technology for at least the first time period, where the second radio access technology is different from the first radio access technology, transmitting, to a network entity associated with the first radio access technology, an indication of a capability of the UE to switch one or more antennas or antenna ports of the second set of antennas or antenna ports from the second radio access technology to the first radio access technology for communication on the frequency band for at least a second time period, and communicating, based on the indication of the capability of the UE, on the frequency band with the network entity via the first set of antennas or antenna ports and via the one or more antennas or antenna ports of the second set of antennas or antenna ports.

An apparatus for wireless communications at a UE is described. The apparatus may include a processor, memory coupled with the processor, and instructions stored in the memory. The instructions may be executable by the processor to cause the apparatus to communicating, on a frequency band and via a first set of antennas or antenna ports of the UE, used a first radio access technology for at least a first time period, communicating, via a second set of antennas or antenna ports of the UE, used a second radio access technology for at least the first time period, where the second radio access technology is different from the first radio access technology, transmit, to a network entity associated with the first radio access technology, an indication of a capability of the UE to switch one or more antennas or antenna ports of the second set of antennas or antenna ports from the second radio access technology to the first radio access technology for communication on the frequency band for at least a second time period, and communicating, base at least in part on the indication of the capability of the UE, on the frequency band with the network entity via the first set of antennas or antenna ports and via the one or more antennas or antenna ports of the second set of antennas or antenna ports.

Another apparatus for wireless communications at a UE is described. The apparatus may include means for communicating, on a frequency band and via a first set of antennas or antenna ports of the UE, using a first radio access technology for at least a first time period, means for communicating, via a second set of antennas or antenna ports of the UE, using a second radio access technology for at least the first time period, where the second radio access technology is different from the first radio access technology, means for transmitting, to a network entity associated with the first radio access technology, an indication of a capability of the UE to switch one or more antennas or antenna ports of the second set of antennas or antenna ports from the second radio access technology to the first radio access technology for communication on the frequency band for at least a second time period, and means for communicating, based on the indication of the capability of the UE, on the frequency band with the network entity via the first set of antennas or antenna ports and via the one or more antennas or antenna ports of the second set of antennas or antenna ports.

A non-transitory computer-readable medium storing code for wireless communications at a UE is described. The code may include instructions executable by a processor to communicating, on a frequency band and via a first set of antennas or antenna ports of the UE, used a first radio access technology for at least a first time period, communicating, via a second set of antennas or antenna ports of the UE, used a second radio access technology for at least the first time period, where the second radio access technology is different from the first radio access technology, transmit, to a network entity associated with the first radio access technology, an indication of a capability of the UE to switch one or more antennas or antenna ports of the second set of antennas or antenna ports from the second radio access technology to the first radio access technology for communication on the frequency band for at least a second time period, and communicating, base at least in part on the indication of the capability of the UE, on the frequency band with the network entity via the first set of antennas or antenna ports and via the one or more antennas or antenna ports of the second set of antennas or antenna ports.

In some examples of the method, apparatuses, and non-transitory computer-readable medium described herein, transmitting the indication of the capability of the UE may include operations, features, means, or instructions for trans-mitting an indication of a quantity of antennas or antenna ports of the second set of antennas or antenna ports available to switch from the second radio access technology to the first radio access technology for an uplink transmission or a downlink transmission.

In some examples of the method, apparatuses, and non-transitory computer-readable medium described herein, the transmitting the indication of the capability of the UE may be based on the second radio access technology being disabled, the second set of antennas or antenna ports having no scheduled traffic, or a subset of the second set of antennas or antenna ports having no scheduled traffic.

In some examples of the method, apparatuses, and non-transitory computer-readable medium described herein, communicating with the network entity may include opera-tions, features, means, or instructions for receiving a set of channel state information reference signals via the first set of antennas or antenna ports and via the second set of antennas or antenna ports and transmitting a channel state information report based on the set of channel state information refer-ence signals.

Some examples of the method, apparatuses, and non-transitory computer-readable medium described herein may further include operations, features, means, or instructions for receiving an indication of a quantity of antennas or antenna ports of the second set of antennas or antenna ports to switch from the second radio access technology to the first radio access technology for reception of the channel state information reference signals.

Some examples of the method, apparatuses, and non-transitory computer-readable medium described herein may further include operations, features, means, or instructions for determining a quantity of antennas or antenna ports of the second set of antennas or antenna ports to switch from the second radio access technology to the first radio access technology for reception of the set of channel state infor-mation reference signals and transmitting, with the channel state information report, an indication of the quantity of antennas or antenna ports.

Some examples of the method, apparatuses, and non-transitory computer-readable medium described herein may further include operations, features, means, or instructions for receiving a request for an availability report of the capability of the UE to switch the second set of antennas or antenna ports from the second radio access technology to the first radio access technology and transmitting the availability report of the capability of the UE to switch the second set of antennas or antenna ports from the second radio access technology to the first radio access technology.

Some examples of the method, apparatuses, and non-transitory computer-readable medium described herein may further include operations, features, means, or instructions for transmitting, to the network entity, an indication of a second switch of the one or more antennas or antenna ports of the second set of antennas or antenna ports from the first radio access technology back to the second radio access technology.

In some examples of the method, apparatuses, and non-transitory computer-readable medium described herein, the transmitting the indication of the second switch may include operations, features, means, or instructions for transmitting, the indication of the second switch via a hybrid automatic repeat request negative acknowledgment feedback message or via a channel state information report.

In some examples of the method, apparatuses, and non-transitory computer-readable medium described herein, transmitting the indication of the capability of the UE may include operations, features, means, or instructions for trans-mitting an antenna sharing pattern indicating a quantity of antennas or antenna ports of the second set of antennas or antenna ports available to switch from the second radio access technology to the first radio access technology for each time slot of a set of time slots.

In some examples of the method, apparatuses, and non-transitory computer-readable medium described herein, transmitting the indication of the capability of the UE may include operations, features, means, or instructions for trans-mitting an antenna sharing pattern indicating a quantity of antennas or antenna ports of first set of antennas or antenna ports and a quantity of antennas or antenna ports of the second set of antennas or antenna ports available to switch from the second radio access technology to the first radio access technology for each time slot of a set of time slots.

In some examples of the method, apparatuses, and non-transitory computer-readable medium described herein, communicating with the network entity may include opera-tions, features, means, or instructions for receiving a trans-mission via a first quantity of the first set of antennas or antenna ports and a second quantity of the second set of antennas or antenna ports and transmitting a hybrid auto-matic repeat request retransmission in a time slot having available the first quantity of the first set of antennas or antenna ports and the second quantity of the second set of antennas or antenna ports.

In some examples of the method, apparatuses, and non-transitory computer-readable medium described herein, communicating with the network entity may include opera-tions, features, means, or instructions for receiving a trans-mission via a first quantity of the first set of antennas or antenna ports and a second quantity of the second set of antennas or antenna ports and transmitting a hybrid auto-matic repeat request retransmission in a time slot having available the first quantity of the first set of antennas or antenna ports.

In some examples of the method, apparatuses, and non-transitory computer-readable medium described herein, communicating with the network entity may include opera-tions, features, means, or instructions for receiving an indi-cation to transmit a sounding reference signal via the second set of antennas or antenna ports and transmitting the sound-ing reference signal via the second set of antennas or antenna ports.

In some examples of the method, apparatuses, and non-transitory computer-readable medium described herein, transmitting the indication of the capability of the UE may include operations, features, means, or instructions for trans-mitting an indication of a quantity of antennas or antenna ports dedicated for the first radio access technology.

A method for wireless communications at a network entity is described. The method may include communicat-ing, with a UE, on a frequency band and via a first set of antennas or antenna ports of the UE, using a first radio access technology for at least a first time period, receiving, from the UE, an indication of a capability of the UE to switch one or more antennas or antenna ports of a second set of antennas or antenna ports dedicated for a second radio access technology to the first radio access technology for communication on the frequency band for at least a second time period, where the second radio access technology is different from the first radio access technology, and communicating, based on the indication of the capability of the UE, on the frequency band with the UE via the first set of antennas or antenna ports and via the one or more antennas or antenna ports of the second set of antennas or antenna ports.

An apparatus for wireless communications at a network entity is described. The apparatus may include a processor, memory coupled with the processor, and instructions stored in the memory. The instructions may be executable by the processor to cause the apparatus to communicating, with a UE, on a frequency band and via a first set of antennas or antenna ports of the UE, used a first radio access technology for at least a first time period, receive, from the UE, an indication of a capability of the UE to switch one or more antennas or antenna ports of a second set of antennas or antenna ports dedicated for a second radio access technology to the first radio access technology for communication on the frequency band for at least a second time period, where the second radio access technology is different from the first radio access technology, and communicating, base at least in part on the indication of the capability of the UE, on the frequency band with the UE via the first set of antennas or antenna ports and via the one or more antennas or antenna ports of the second set of antennas or antenna ports.

Another apparatus for wireless communications at a network entity is described. The apparatus may include means for communicating, with a UE, on a frequency band and via a first set of antennas or antenna ports of the UE, using a first radio access technology for at least a first time period, means for receiving, from the UE, an indication of a capability of the UE to switch one or more antennas or antenna ports of a second set of antennas or antenna ports dedicated for a second radio access technology to the first radio access technology for communication on the frequency band for at least a second time period, where the second radio access technology is different from the first radio access technology, and means for communicating, based on the indication of the capability of the UE, on the frequency band with the UE via the first set of antennas or antenna ports and via the one or more antennas or antenna ports of the second set of antennas or antenna ports.

A non-transitory computer-readable medium storing code for wireless communications at a network entity is described. The code may include instructions executable by a processor to communicating, with a UE, on a frequency band and via a first set of antennas or antenna ports of the UE, used a first radio access technology for at least a first time period, receive, from the UE, an indication of a capability of the UE to switch one or more antennas or antenna ports of a second set of antennas or antenna ports dedicated for a second radio access technology to the first radio access technology for communication on the frequency band for at least a second time period, where the second radio access technology is different from the first radio access technology, and communicating, base at least in part on the indication of the capability of the UE, on the frequency band with the UE via the first set of antennas or antenna ports and via the one or more antennas or antenna ports of the second set of antennas or antenna ports.

In some examples of the method, apparatuses, and non-transitory computer-readable medium described herein, receiving the indication of the capability of the UE may include operations, features, means, or instructions for receiving an indication of a quantity of antennas or antenna ports of the second set of antennas or antenna ports available to switch from the second radio access technology to the first radio access technology for an uplink transmission or a downlink transmission.

In some examples of the method, apparatuses, and non-transitory computer-readable medium described herein, communicating with the UE may include operations, features, means, or instructions for transmitting a set of channel state information reference signals via the first set of antennas or antenna ports and via the second set of antennas or antenna ports and receiving a channel state information report.

Some examples of the method, apparatuses, and non-transitory computer-readable medium described herein may further include operations, features, means, or instructions for transmitting an indication of a quantity of antennas or antenna ports of the second set of antennas or antenna ports to switch from the second radio access technology to the first radio access technology for reception of the channel state information reference signals.

In some examples of the method, apparatuses, and non-transitory computer-readable medium described herein, communicating with the UE may include operations, features, means, or instructions for transmitting a request for an availability report of the capability of the UE to switch the second set of antennas or antenna ports from the second radio access technology to the first radio access technology and receiving the availability report of the capability of the UE to switch the second set of antennas or antenna ports from the second radio access technology to the first radio access technology.

Some examples of the method, apparatuses, and non-transitory computer-readable medium described herein may further include operations, features, means, or instructions for receiving, from the UE, an indication of a second switch of the one or more antennas or antenna ports of the second set of antennas or antenna ports from the first radio access technology back to the second radio access technology.

In some examples of the method, apparatuses, and non-transitory computer-readable medium described herein, the receiving the indication of the second switch may include operations, features, means, or instructions for receiving the indication of the second switch via a hybrid automatic repeat request negative acknowledgment feedback message or via a channel state information report.

Some examples of the method, apparatuses, and non-transitory computer-readable medium described herein may further include operations, features, means, or instructions for receiving, from the UE, a quantity of hybrid automatic repeat request negative acknowledgment feedback messages and identifying a second switch of the second set of antennas or antenna ports from the first radio access technology back to the second radio access technology based on the quantity of hybrid automatic repeat request negative acknowledgment feedback messages exceeding a threshold.

In some examples of the method, apparatuses, and non-transitory computer-readable medium described herein, receiving the indication of the capability of the UE may include operations, features, means, or instructions for receiving an antenna sharing pattern indicating a quantity of antennas or antenna ports of the second set of antennas or antenna ports available to switch from the second radio access technology to the first radio access technology for each time slot of a set of time slots.

In some examples of the method, apparatuses, and non-transitory computer-readable medium described herein, transmitting the indication of the capability of the UE may include operations, features, means, or instructions for receiving an antenna sharing pattern indicating a quantity of antennas or antenna ports of first set of antennas or antenna ports and a quantity of antennas or antenna ports of the second set of antennas or antenna ports available to switch from the second radio access technology to the first radio access technology for each time slot of a set of time slots.

In some examples of the method, apparatuses, and non-transitory computer-readable medium described herein, communicating with the UE may include operations, features, means, or instructions for transmitting an indication to transmit a sounding reference signal via the second set of antennas or antenna ports and receiving the sounding reference signal via the second set of antennas or antenna ports.

BRIEF DESCRIPTION OF THE DRAWINGS

FIGS. 15 and 16 show flowcharts illustrating methods that support antenna sharing between RATs in accordance with one or more aspects of the present disclosure.

DETAILED DESCRIPTION

Figure 1:
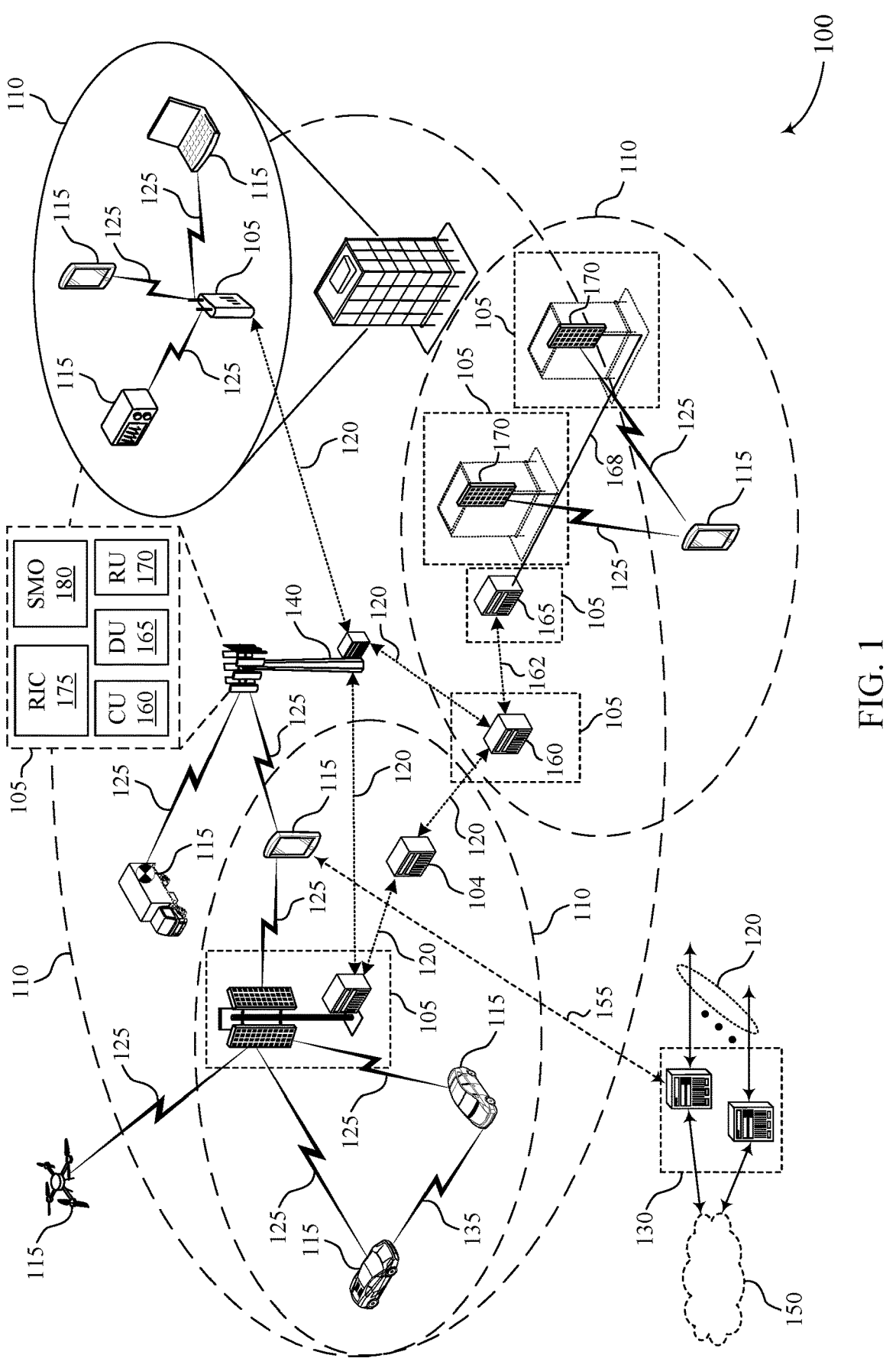
FIG. 1 shows an example of a wireless communications system that supports antenna sharing between radio access technologies (RATs) in accordance with one or more aspects of the present disclosure.

A user equipment (UE) may have a first set of antennas or antenna ports dedicated or configured for communication on a frequency band using a first radio access technology (RAT), such as a 5G or 6G communications system. The UE may also have a second set of antennas or antenna ports dedicated or configured for communication using a second RAT, such as Wi-Fi. The UE may communicate on the same frequency band, such as 6 GHz, using the first RAT and the second RAT. Additionally, the UE may communicate on frequency bands that may be close using the first RAT and the second RAT. For example, the UE may communicate on adjacent frequency bands, such as 5 GHz and 6 GHz, with the first RAT using the 5 GHz band and the second RAT using the 6 GHz band. When the UE is not communicating using the second RAT, such as Wi-Fi, the second set of antennas or antenna ports, are not utilized.

A UE may share unused antennas or antenna ports or antenna components dedicated or configured for the second RAT for communications with a network entity of the first RAT. The UE may communicate on a frequency band, such as 6 GHz, via a first set of antennas or antenna ports of the UE, using a first RAT. The UE may communicate, via a second set of antennas or antenna ports of the UE, using a second RAT. For example, the first RAT may be a 5G New Radio (NR) or 6G communications system, and the second RAT may be Wi-Fi. To share the antennas or antenna ports dedicated or configured for the second RAT, the UE may transmit, to the network entity of the first RAT, an indication of a capability to switch one or more antennas or antenna ports of the second set of antennas or antenna ports from the second RAT to the first RAT for communication on the frequency band. The UE may communicate on the frequency band with the network entity via the first set of antennas or antenna ports and via one or more antennas or antenna ports of the second set of antennas or antenna ports.

In some examples, the UE may indicate, to the network entity, a quantity of antennas or antenna ports of the second set available for uplink or downlink transmissions. Scenarios when the antennas or antenna ports of the second set may be shared for communications with the network entity may include when the second RAT is disabled on the UE, when the antennas or antenna ports of the second RAT have no scheduled traffic, or when a subset of the second set of antennas or antenna ports have no scheduled traffic. The UE may transmit channel state information (CSI) reports to the network entity for the shared antennas or antenna ports. In some examples, the UE may indicate to the network entity the availability of the shared antennas or antenna ports. For example, UE may indicate the shared antennas or antenna ports available for uplink or downlink transmissions for a set of time slots. Additionally, the UE may indicate to the network entity that the antenna and antenna port sharing is terminated.

Aspects of the disclosure are initially described in the context of wireless communications systems. Additional aspects of the disclosure are described in the context of examples of wireless communications systems, examples of a time slot diagram, and an example process flow. Aspects of the disclosure are further illustrated by and described with reference to apparatus diagrams, system diagrams, and flowcharts that relate to antenna sharing between RATs.

FIG. 1 shows an example of a wireless communications system 100 that supports antenna sharing between RATs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support antenna sharing between RATs as described herein. For example, some operations described as being performed by a UE 115 or a network entity 105

(e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may have a first set of antennas or antenna ports dedicated or configured for communication on a frequency band using a first RAT, such as a 5G NR or 6G communications system. The UE 115 may also have a second set of antennas or antenna ports dedicated or configured for communication using a second RAT, such as Wi-Fi. The UE 115 may communicate on the same frequency band, such as 6 GHZ, using the first RAT and the second RAT. Additionally, the UE may communicate on frequency bands that may be close using the first RAT and the second RAT. For example, the UE may communicate on adjacent frequency bands, such as 5 GHz and 6 GHz, with the first RAT using the 5 GHz band and the second RAT using the 6 GHz band. When the UE 115 is not communicating using the second RAT, such as Wi-Fi, the second set of antennas or antenna ports, are not utilized.

A UE 115 may share unused antennas or antenna ports or antenna components dedicated or configured for the second RAT for communications with a network entity 105 of the first RAT. The UE 115 may communicate on a frequency band, such as 6 GHz, via a first set of antennas or antenna ports of the UE 115, using a first RAT. The UE 115 may communicate, via a second set of antennas or antenna ports of the UE 115, using a second RAT. For example, the first RAT may be 5G or 6G communications system, and the second RAT may be Wi-Fi. To share the antennas or antenna ports dedicated or configured for the second RAT, the UE 115 may transmit, to the network entity 105 of the first RAT, an indication of a capability to switch one or more antennas or antenna ports of the second set of antennas or antenna ports from the second RAT to the first RAT for communication on the frequency band. The UE 115 may communicate on the frequency band with the network entity 105 via the first set of antennas or antenna ports and via one or more antennas or antenna ports of the second set of antennas or antenna ports.

In some examples, the UE 115 may indicate, to the network entity 105, a quantity of antennas or antenna ports of the second set available for uplink or downlink transmissions. Scenarios when the antennas or antenna ports of the second set may be shared for communications with the network entity 105 may include when the second RAT is disabled, when the antennas or antenna ports of the second RAT having no scheduled traffic, or when a subset of the second set of antennas or antenna ports having no scheduled traffic. The UE 115 may transmit CSI reports to the network entity 105 for the shared antennas or antenna ports. In some examples, the UE 115 may indicate to the network entity the availability of the shared antennas or antenna ports. For example, UE 115 may indicate the shared antennas or antenna ports available for uplink or downlink transmissions for a set of time slots. Additionally, the UE 115 may indicate to the network entity 105 that the antenna and antenna port sharing is terminated.

Figure 2:
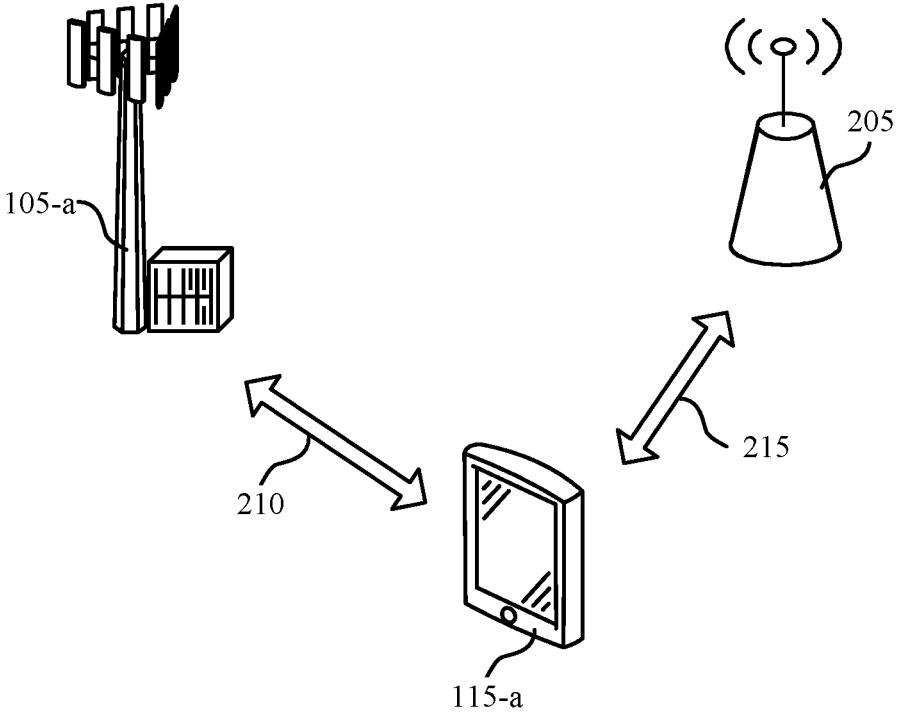
FIG. 2 shows an example of a wireless communications system that supports antenna sharing between RATs in accordance with one or more aspects of the present disclosure.

FIG. 2 shows an example of a wireless communications system 200 that supports antenna sharing between RATs in accordance with one or more aspects of the present disclosure. The wireless communications system 200 may implement or may be implemented by aspects of the wireless communication system 100. For example, the wireless communications system 200 may include a network entity 105-*a*, which may be an example of the network entity 105 described with reference to FIG. 1. The wireless communications system 200 may include a UE 115-*a*, which may be an example of the UEs 115 described with reference to FIG. 1.

The UE 115-*a* may communicate with the network entity 105-*a* via a communication link 210. The communication link 210 may be an example of the communication link 125, described in reference to FIG. 1. The communication link 210 a may include bi-directional links that enable both the uplink and downlink communication. For example, the UE 115-*a* may transmit, to the network entity 105-*a*, uplink signals (e.g., uplink transmissions), such as uplink control signals or uplink data signals, and the UE 115-*a* may receive, from the network entity 105-*a*, downlink signals (e.g., downlink transmissions), such as downlink control signals or downlink data signals. The UE 115-*a* may communicate with the network entity 105-*a* on a frequency band, such as 6 GHz, via a first set of antennas or antenna ports of the UE 115-*a*, using a first RAT such as a 5G or 6G communications system. In some examples, the first set of antennas or antenna ports of the UE 115-*a* may be dedicated or configured for communication using the first RAT, such as cellular communications.

In some examples, the UE 115-*a* may communicate with a wireless communication device 205 via a communication link 215. The communication link 215 may include bi-directional links that enable both the uplink and downlink communication. For example, the UE 115-*a* may transmit, to the wireless communication device 205, uplink signals (e.g., uplink transmissions), such as uplink control signals or uplink data signals, and the UE 115-*a* may receive, from the wireless communication device 205, downlink signals (e.g., downlink transmissions), such as downlink control signals or downlink data signals. In some examples, the UE 115-*a* may exchange sidelink communications with the wireless communication device 205 (e.g., the wireless communication device 205 may be another UE 115). The UE 115-*a* may communicate with the wireless communication device 205 on a frequency band, such as 5 GHz or 6 GHz frequency band, via a second set of antennas or antenna ports of the UE 115-*a*, using a second RAT, such as Wi-Fi. For example, the second set of antennas or antenna ports of the UE 115-*a* may be dedicated or configured for communication using the second RAT, such as Wi-Fi communications, and the wireless communication device 205 may be an access point. In some examples, the other frequency bands than 6 GHz may be used communications for the first RAT and the second RAT.

In some examples, the UE 115-*a* may transmit control signaling indicating assistance information to the network entity 105-*a* of the first RAT and control signaling indicating assistance information to the wireless communication device 205 of the second RAT. The network entity 105-*a* may transmit control signaling indicating scheduling information to the UE 115-*a*, and the wireless communication device 205 may transmit control signaling indicating scheduling information to the UE 115-*a*. For example, the network entity 105-*a* may schedule a downlink transmission for the first set of antennas or antenna ports of the UE 115-*a*. In some examples, when the UE 115-*a* is not communicating using the second RAT, the second set of antennas or antenna ports is not utilized. The UE 115-*a* may have better knowledge of channel conditions, service requirements, power status and available antenna resources than the network entity 105-*a* and wireless communication device 205, so the UE 115-*a* may be able to transmit control signaling to the network entity 105-*a* indicating information that may be used for scheduling resources, such as available antennas or antenna ports.

In some examples, the UE 115-*a* may share unused antennas or antenna ports dedicated or configured for the second RAT for communications with a network entity 105-*a* of the first RAT. The UE 115-*a* may transmit, to the network entity 105-*a* of the first RAT, an indication of a capability to switch one or more antennas or antenna ports of the second set of antennas or antenna ports from the second RAT to the first RAT for communication on the frequency band. The UE 115-*a* may communicate on the frequency band with the network entity 105-*a* via the first set of antennas or antenna ports and via the one or more antennas or antenna ports of the second set of antennas or antenna ports.

In some examples, the UE 115-*a* may transmit, to the network entity 105-*a*, an indication of a quantity of antennas or antenna ports of the first set of antennas or antenna ports from the first RAT, such as the quantity of dedicated cellular antennas or antenna ports for the configured frequency band. The UE 115-*a* may transmit, to the network entity 105-*a*, an indication of a quantity of antennas or antenna ports of the second set of antennas or antenna ports available to switch from the second RAT to the first RAT for an uplink transmission or a downlink transmission.

Figure 3A:
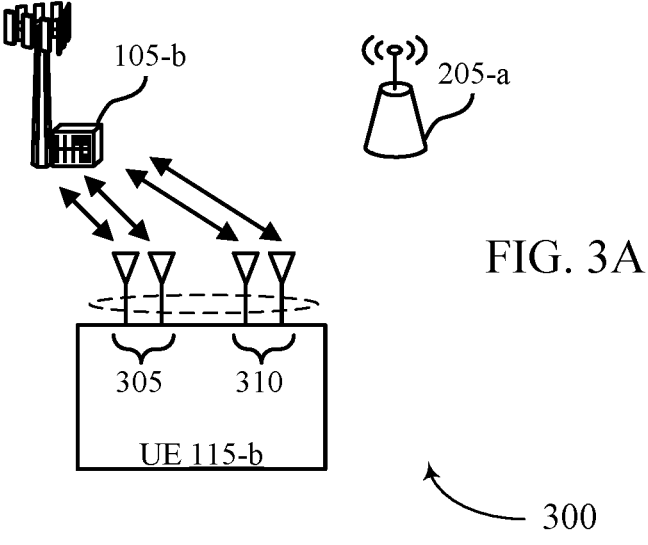
FIGS. 3A and 3B show examples of a wireless communications system that supports antenna sharing between RATs in accordance with one or more aspects of the present disclosure.
Figure 3B:
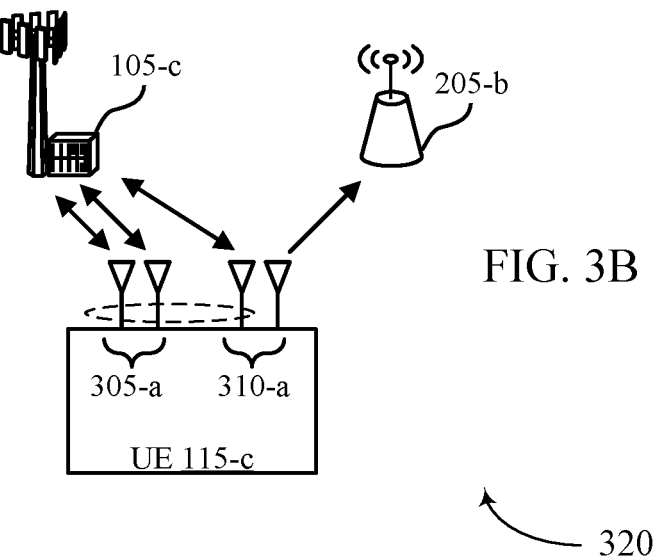

FIGS. 3A and 3B show examples of a wireless communications system 300, and a wireless communications system 320, respectively, that support antenna sharing between RATs in accordance with one or more aspects of the present disclosure. The wireless communications system 300 and the wireless communications system 320 may implement or may be implemented by aspects of the wireless communications system 100 and the wireless communications system 200. For example, the wireless communications system 300 may include a network entity 105-*b* and the wireless communications system 320 may include a network entity 105-*c*, which may be examples of network entities 105 described herein. The wireless communications system 300 may include a UE 115-*b* and the wireless communications system 320 may include a UE 115-*c*, which may be examples of the UEs 115 as described herein. The wireless communications system 300 may include a wireless communication device 205-*a*, and the wireless communications system 320 may include a wireless communication device 205-*b*, which may be examples of wireless communication devices 205 described herein.

In some examples, the UE 115-*b* may include a first set of antennas or antenna ports 305 and the UE 115-*c* may include a first set of antennas or antenna ports 305-*a* dedicated or configured for communication using the first RAT, such as cellular communications. The UE 115-*b* may include a second set of antennas or antenna ports 310 and the UE 115-*c* may include a second set of antennas or antenna ports 310-*a* dedicated or configured for communication using the second RAT, such as Wi-Fi communications.

In some examples, the UE 115-*b* and UE 115-*c* may be capable of sharing one or more antennas or antenna ports of the second set of antennas or antenna ports 310 for communications with the network entity 105-*b* and network entity 105-*c*, respectively, on a frequency band using a first RAT. The capability of the UE 115-*b* and UE 115-*c* to share one or more antennas or antenna ports of the second set of antennas or antenna ports 310 and one or more antennas or antenna ports of the second set of antennas or antenna ports 310-*a* may be based on the second RAT being disabled or off, the second set of antennas or antenna ports having no scheduled traffic on the second RAT, or a subset of the second set of antennas or antenna ports having no scheduled traffic on the second RAT.

For example, as illustrated in FIG. 3A, the second RAT, such as Wi-Fi, may be disabled or off. When the second RAT is disabled, the UE 115-*b* may transmit, to the network entity 105-*a*, an indication that two antennas or antenna ports of the second set of antennas or antenna ports are available to switch from the second RAT to the first RAT for uplink transmissions or a downlink transmissions. Based on the indication, the network entity 105-*b* may transmit uplink or downlink transmission to the UE 115-*b* using first set of antennas or antenna ports 305 and the two antennas or antenna ports of the second set of antennas or antenna ports 310.

As another example, as illustrated in FIG. 3A, the second set of antennas or antenna ports 310 may have no scheduled second RAT traffic. When the second set of antennas or antenna ports 310 have no scheduled second RAT traffic, the UE 115-*b* may transmit, to the network entity 105-*a*, an indication that two antennas or antenna ports of the second set of antennas or antenna ports 310 are available to switch from the second RAT to the first RAT for uplink transmissions or a downlink transmissions. Based on the indication, the network entity 105-*b* may transmit uplink or downlink transmission to the UE 115-*b* using first set of antennas or antenna ports 305 and the two antennas or antenna ports of the second set of antennas or antenna ports 310. After a time period, the UE 115-*b* may have second RAT scheduled traffic on the second set of antennas or antenna ports 310. Accordingly, the UE 115-*b* may transmit, to the network entity 105-*b*, an indication of a second switch of the second set of antennas or antenna ports from the first RAT back to the second RAT. The network entity 105-*b* may stop using the second set of antennas or antenna ports 310, and the UE 115-*b* may receive second RAT traffic on the second set of antennas or antenna ports 310.

FIG. 3B illustrates an example scenario of a subset of the second set of antennas or antenna ports 310-*a* having no scheduled second RAT traffic and the antenna or antenna port sharing may be semi-persistent. The UE 115-*b* may have second RAT traffic scheduled for a time period on one of the two antennas or antenna ports of the second set of antennas or antenna ports 310-*a*. For example, the UE 115-*b* may have a antennas for transmission and b antennas for reception (aTbR) for a second RAT uplink scheduled and b-a antennas (or antenna ports) may be shared for the first RAT downlink transmission in the Wi-Fi uplink slots. In another example, the UE 115-*b* may have aTbR for a second RAT uplink scheduled and b-a antennas (or antenna ports) may be shared for the first RAT uplink transmission in the Wi-Fi uplink slots. As shown in FIG. 3B, the UE 115-*c* has second RAT traffic scheduled on one of the two antennas or antenna ports of the second set of antennas or antenna ports 310-*a*. For this scenario, the UE 115-*c* may transmit, to the network entity 105-*c*, an indication that one antenna of the antenna port of the second set of antennas or antenna ports 310-*a* is available to switch from the second RAT to the first RAT for uplink transmissions or a downlink transmissions. Based on the indication, the network entity 105-*c* may transmit uplink or downlink transmission to the UE 115-*c* using first set of antennas or antenna ports 305-*a* and one of the two antennas or antenna ports of the second set of antennas or antenna ports 310-*a*. After a time period, the UE 115-*c* may have scheduled second RAT traffic on both of the second set of antennas or antenna ports 310-*a*. Accordingly, the UE 115-*c* may transmit, to the network entity 105-*c*, an indication of a second switch of the second set of antennas or antenna ports from the first RAT back to the second RAT. The network entity 105-*b* may stop using one of the two second set of antennas or antenna ports 310-*a*, and the UE 115-*b* may receive second RAT traffic on both of the second set of antennas or antenna ports 310-*a*.

In some examples, the UE 115-*c* may report one or more CSI reports based on the capability of antenna or antenna port sharing for the configured frequency band. The UE 115-*c* may receive, from the network entity 105-*c*, a set of CSI reference signals (CSI-RSs) via the first set of antennas or antenna ports 305-*a* and via one or more of the second set of antennas or antenna ports 310-*a*. In one example, the UE 115-*c* may transmit, to the network entity 105-*c*, one or more CSI reports based on the set of CSI-RSs using the first set of antennas or antenna ports 305-*a* (e.g., cellular dedicated or configured antennas or antenna ports). In another example, the UE 115-*c* may transmit, to the network entity 105-*c*, one or more CSI reports based on the set of CSI-RSs using the first set of antennas or antenna port 305-*a* (e.g., cellular or configured dedicated antennas or antenna ports) and shared antennas or antenna ports of the second set of antennas or antenna ports 310-*a* of the second RAT. Accordingly, the network entity 105-*c* may consider channel conditions between the network entity 105-*c* and the antennas of the UE 115-*c* that may be used for communications via the first RAT (e.g., the first set of antennas or antenna ports 305-*a* and the one or more antennas of the second set of antennas or antenna ports 310-*a*).

In some examples, prior to transmitting the CSI reports using the dedicated or configured cellular antennas or antenna ports and the shared antennas or antenna ports of the second RAT, the UE 115-*c* may receive, from the network entity 105-*c*, an indication of a quantity of the second set of antennas or antenna ports 310-*a* to switch from the second RAT to the first RAT for reception of the CSI-RSs. In another example, the UE 115-*c* may determine a quantity of the second set of antennas or antenna ports 310-*a* to switch from the second RAT to the first RAT for reception of the CSI-RSs, and the UE 115-*c* may transmit the CSI reports using the first set of antennas or antenna ports 305-*a* and the determined quantity of the second set of antennas or antenna ports 310-*a*.

In some examples, the network entity 105-*c* may request the UE 115-*c* to report the availability of the second set of antennas or antenna ports 310-*a* for the configured frequency band. For example, the UE 115-*c* may receive, from the network entity 105-*c*, a request for an availability report of the capability of the UE 115-*c* to switch one or more of the antennas or antenna ports of the second set of antennas or antenna ports 310-*a* from the second RAT to the first RAT. The UE 115-*c* may transmit, to the network entity 105-*c*, the availability report of the capability of the UE 115-*c* to switch one or more of the second set of antennas or antenna ports 310-*a* from the second RAT to the RAT. In some examples, the availability may be based on the scenario of the second RAT being disabled or off status, the second RAT having no scheduled traffic status, a subset of the second set of antennas or antenna ports 310-*a* having no schedule second RAT traffic, or a second RAT uplink time slots availability status. The availability report in a time domain may be associated to a global navigation satellite system (GNSS).

In some examples, the UE 115-*c* may terminate antenna or antenna port sharing to guarantee service on the second RAT. For example, the UE 115-*c* may transmit, to the network entity 105-*c*, an indication of disabling the antenna sharing of the one or more antennas or antenna ports of the second set of antennas or antenna ports 310-*a*. In one example, the UE 115-*c* may indicate the disabling of antenna sharing with a HARQ negative acknowledgment (NACK) feedback message. In another example, the UE 115-*c* may indicate the disabling of antenna sharing in one or more CSI reports. In some examples, the network entity 105-*c* may implicitly determine that the UE 115-*c* has disabled the shared antennas or antenna ports. For example, the network entity 105-*c* may receive, from the UE 115-*c*, a quantity of HARQ-NACK feedback messages, and the network entity 105-*c* may identifying that the antenna sharing has been disabled based on the quantity of HARQ-NACK feedback messages exceeding a threshold. The threshold may be predefined, such as in a protocol or communications standard.

In some examples, the UE 115-*c* may report a semi-persistent antenna sharing pattern to the network entity 105-*c* that may assist with scheduling the antenna resources.

Figure 4:
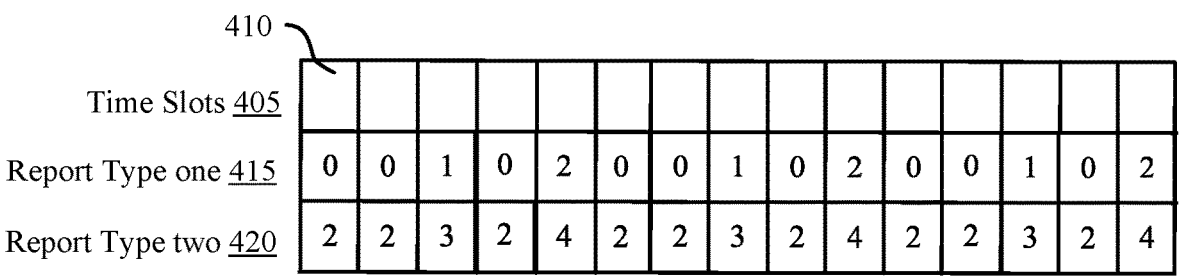
FIG. 4 shows an example of a time slot diagram that supports antenna sharing between RATs in accordance with one or more aspects of the present disclosure.

FIG. 4 shows an example of a time slot diagram 400 that supports antenna sharing between RATs in accordance with one or more aspects of the present disclosure. In some examples, the time slot diagram 400 may implement or may be implemented by aspects of the wireless communications system 100, the wireless communications system 200, the wireless communications system 300, and the wireless communications system 320 as described in FIGS. 1, 2, 3A and 3B, respectively.

As shown in FIG. 4, the time slot diagram 400 includes a set of time slots 405. In some examples, each slot or each time unit of the set of slots or set of time units may be one symbol or multiple symbols, one time slot or multiple time slots, one subframe or multiple subframes or one frame or multiple frames. In one example, the UE 115-*c* may report (e.g., report type one 415) a quantity of the second set of antennas or antenna ports that may be used for uplink or downlink transmissions for each time slot 410 of the set of time slots 405. For example, zero shared antennas or antenna ports are available in the first time slot, zero shared antennas or antenna ports are available in the second time slot, and one shared antenna or antenna ports is available in the third time slot. For this example, the UE 115-*c* may transmit, to the network entity 105-*c*, the antenna sharing pattern indicating the quantity of antennas or antenna ports of the second set of antennas or antenna ports available to switch from the second RAT to the first RAT for each time slot of a set of time slots. In some examples, a quantity of dedicated or configured first RAT antennas or antenna ports may be reported in a UE capability report.

In some examples, the UE 115-*c* may report (e.g., report type two 420) a quantity of dedicated or configured first RAT antennas or antenna ports and shared second RAT antennas or antenna ports that may be used for uplink or downlink transmissions for each time slot 410 of the set of time slots 405. For example, two antennas or antenna ports are available in the first time slot, two antennas or antenna ports are available in the second time slot, and three antennas or antenna ports are available in the third time slot. For this example, the UE 115-*c* may transmit, to the network entity 105-*c*, the antenna sharing pattern indicating the quantity of antennas or antenna ports of first set of antennas or antenna ports and a quantity of antennas or antenna ports of the second set of antennas or antenna ports available to switch from the second RAT to the first RAT for each time slot of a set of time slots.

Figure 5:
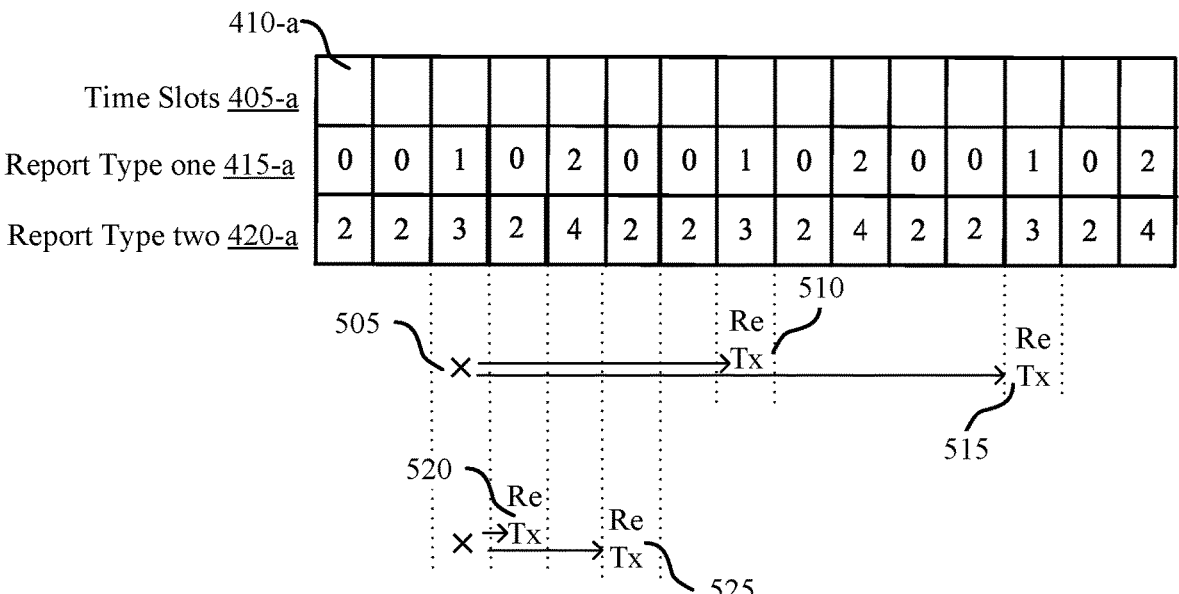
FIG. 5 shows an example of a time slot diagram that supports antenna sharing between RATs in accordance with one or more aspects of the present disclosure.

FIG. 5 shows an example of a time slot diagram 500 that supports antenna sharing between RATs in accordance with one or more aspects of the present disclosure. In some examples, the time slot diagram 500 may implement or may be implemented by aspects of the wireless communications system 100, the wireless communications system 200, the wireless communications system 300, and the wireless communications system 320 as described in FIGS. 1, 2, 3A and 3B, respectively.

In some examples, a HARQ retransmission may be scheduled based on available antenna resources of the UE 115-*c*. As shown in FIG. 5, the time slot diagram 500 include a set of time slots 405-*a*. The time slot diagram 500 also includes the report type one 415-*a* indicating a quantity of shared antennas or antenna ports of the second RAT that may be used for uplink or downlink transmissions for each time slot 410-*a* of the set of time slots 405-*a*. The time slot diagram 500 also includes the report type two 420-*a* indicating a quantity of dedicated or configured first RAT antennas or antenna ports and shared antennas or antenna ports of the second RAT that may be used for uplink or downlink transmissions for each time slot 410-*a* of the set of time slots 405-*a*.

In some examples, the HARQ retransmission may be scheduled in a time slot where the quantity of antennas or antenna ports is the same as the initial transmission. For example, the original transmission may be received at time slot 505. For time slot 505, the quantity of dedicated and shared antennas is three as shown for the report type two 420-*a*. The HARQ retransmission may then be scheduled at time slots 510 or time slot 515 where three dedicated and shared antennas are available as shown from the report type two 420-*a*. For this example, the UE 115-*c* may receive, from the network entity 105-*c*, a transmission via a first quantity of the first set of antennas or antenna ports and a second quantity of the second set of antennas or antenna ports. The UE 115-*c* may transmit a HARQ retransmission in a time slot having available the first quantity of the first set of antennas or antenna ports and the second quantity of the second set of antennas or antenna ports.

In another example, the HARQ retransmission may be scheduled in a time slot where the quantity of antennas or antenna ports is the dedicated or configured antennas for the first RAT. For example, the original transmission may be received at time slot 505. For time slot 505, the quantity of dedicated or configured antennas is two. The HARQ retransmission may then be scheduled at any of the time slots 510, such a time slot 520 or time slot 525, where the dedicated or configured antennas (e.g., two antennas or antenna ports of the first set of antennas or antenna ports) are available. For this example, the UE 115-*c* may receive, from the network entity 105-*c*, a transmission via a first quantity of the first set of antennas or antenna ports and a second quantity of the second set of antennas or antenna ports. The UE 115-*c* may transmit a HARQ retransmission in a time slot having available the first quantity of the first set of antennas or antenna ports.

In some examples, the UE 115-*c* may be indicated to use the shared antennas or antenna ports from the second RAT to send sounding reference signal (SRS) for antenna switching usage. Based the SRS received using antenna switching, the network entity 105-*c* may perform downlink MIMO beamforming based on the properties of downlink or uplink channel reciprocity. For example, the UE 115-*c* may receive, from the network entity 105-*c*, an indication to transmit an SRS via one or more of the second set of antennas or antenna ports. The UE 115-*c* may transmit the SRS via one or more of the second set of antennas or antenna ports.

Figure 6:
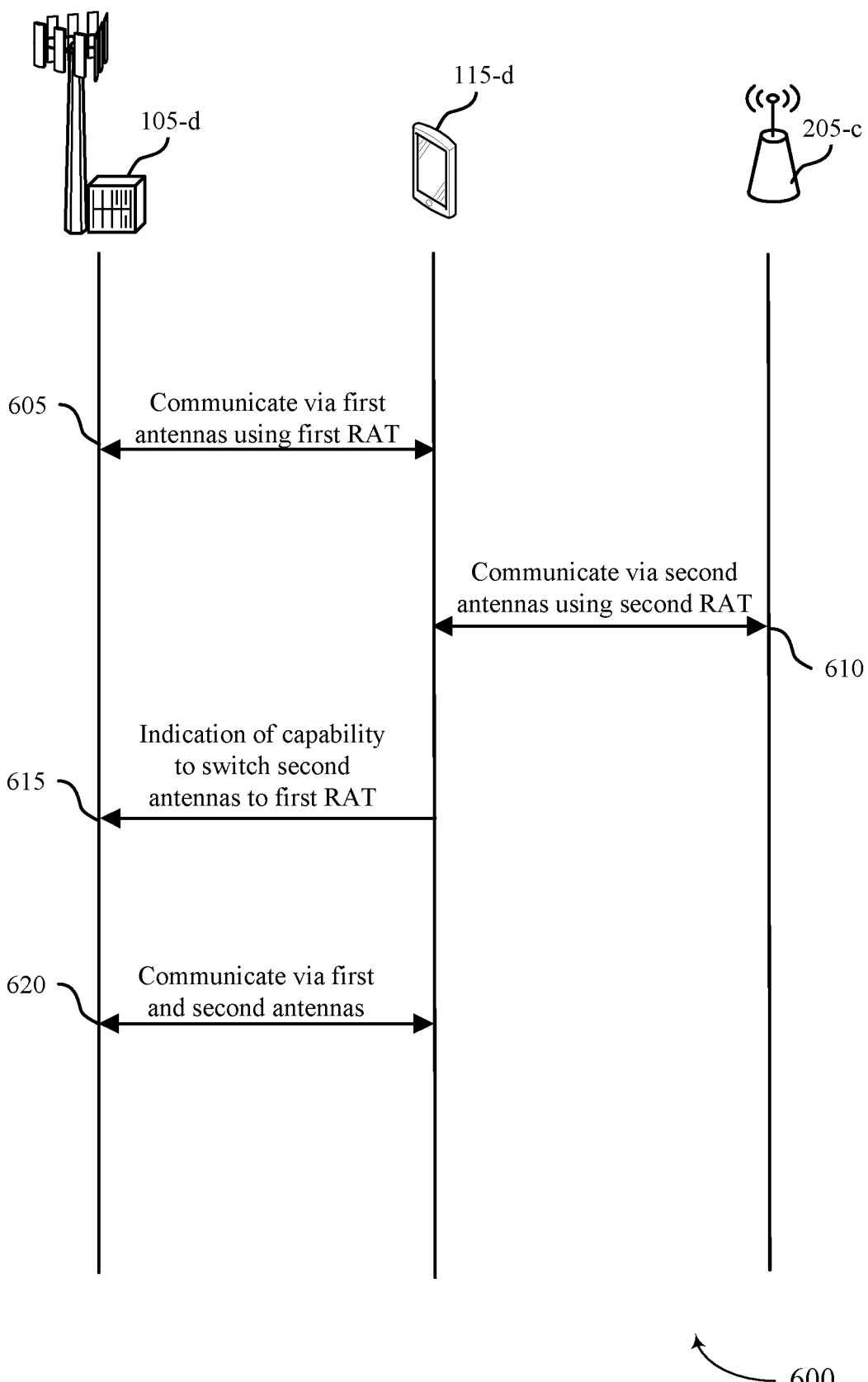
FIG. 6 shows an example of a process flow that supports antenna sharing between RATs in accordance with one or more aspects of the present disclosure.

FIG. 6 shows an example of a process flow 600 that supports antenna sharing between RATs in accordance with one or more aspects of the present disclosure. The process flow 600 may include a network entity 105-*d*, a wireless communication device 205-*c* and a UE 115-*d*. The network entity 105-*d* may be an example of a network entity 105 as described herein. The wireless communication device 205-*c* may be an example of a wireless communication device 205 as described herein. The UE 115-*d* may be an example of a UE 115 as described herein. In the following description of the process flow 600, the communications between the network entity 105-*d*, the wireless communication device 205-*c* and the UE 115-*d* may be transmitted in a different order than the example order shown, or the operations performed by the network entity 105-*d*, the wireless communication device 205-*c* and the UE 115-*d* may be performed in different orders or at different times. Some operations may also be omitted from the process flow 600, and other operations may be added to the process flow 600.

At 605, the UE 115-*d* may communicate, with the network entity 105-*d* on a frequency band and via a first set of antennas or antenna ports of the UE 115-*d*, using a first RAT for at least a first time period. At 610, the UE 115-*d* may communicate, with the wireless communication device 205-*c* via a second set of antennas or antenna ports of the UE, using a second RAT for at least the first time period. The second RAT is different from the first RAT.

At 615, the UE 115-*d* may transmit, to the network entity 105-*d* associated with the first RAT, an indication of a capability of the UE 115-*d* to switch one or more of the second set of antennas or antenna ports from the second RAT to the first RAT for communication on the frequency band for at least a second time period. In some examples, the UE 115-*d* may transmit an indication of a quantity of antennas or antenna ports of the second set of antennas or antenna ports available to switch from the second RAT to the first RAT for an uplink transmission or a downlink transmission. In some examples, the indication of the capacity to switch one or more of the second set of antennas or antenna ports may be based on the second RAT being disabled, the second set of antennas or antenna ports having no scheduled traffic, or a subset of the second set of antennas or antenna ports having no scheduled traffic.

In some examples, the UE 115-*d* may transmit, to the network entity 105-*d*, an antenna sharing pattern indicating a quantity of antennas or antenna ports of the second set of antennas or antenna ports available to switch from the second RAT to the first RAT for each time slot of a set of time slots. In some examples, the UE 115-*d* may transmit, to the network entity 105-*d*, an antenna sharing pattern indicating a quantity of antennas or antenna ports of first set of antennas or antenna ports and a quantity of antennas or antenna ports of the second set of antennas or antenna ports available to switch from the second RAT to the first RAT for each time slot of a set of time slots. In some examples, the UE 115-*d* may transmit, to the network entity 105-*d*, an indication of a quantity of the first set antennas or antenna ports dedicated or configured for the first RAT.

At 620, the UE 115-*d* may communicate, based at least in part on the indication of the capability of the UE 115-*d*, on the frequency band with the network entity 105-*d* via the first set of antennas or antenna ports and via the one or more antennas or antenna ports of the second set of antennas or antenna ports. In some examples, the UE 115-*d* may receive, from the network entity 105-*d*, a set of CSI-RSs via the first set of antennas or antenna ports and via the second set of antennas or antenna ports, and the UE 115-*d* may transmit, to the network entity 105-*d*, a CSI report based on the set of CSI-RSs. In some examples, the UE 115-*d* may receive, from the network entity 105-*d*, an indication of a quantity of antennas or antenna ports of the second set of antennas or antenna ports to switch from the second RAT to the first RAT for reception of the CST reference signals. In some examples, the UE 115-*d* may determine a quantity of antennas or antenna ports of the second set of antennas or antenna ports to switch from the second RAT to the first RAT for reception of the set of CSI-RSs, and the UE 115-*d* may transmit, with the CSI report, an indication of the quantity of antennas or antenna ports.

In some examples, the UE 115-*d* may receive, from the network entity 105-*d* a request for an availability report of the capability of the UE 115-*d* to switch the second set of antennas or antenna ports from the second RAT to the first RAT, and the UE 115-*d* may transmit, to the network entity 105-*d*, the availability report of the capability of the UE 115-*d* to switch the second set of antennas or antenna ports from the second RAT to the first RAT.

In some examples, the UE 115-*d* may receive, from the network entity 105-*d*, a transmission via a first quantity of the first set of antennas or antenna ports and a second quantity of the second set of antennas or antenna ports, and the UE 115-*d* may transmit, to the network entity 105-*d*, a HARQ retransmission in a time slot having available the first quantity of the first set of antennas or antenna ports and the second quantity of the second set of antennas or antenna ports. In some examples, the UE 115-*d* may receive, from the network entity 105-*d*, a transmission via a first quantity of the first set of antennas or antenna ports and a second quantity of the second set of antennas or antenna ports, and the UE 115-*d* may transmit, to the network entity 105-*d*, a HARQ retransmission in a time slot having available the first quantity of the first set of antennas or antenna ports. In some examples, the UE 115-*d* may receive, from the network entity 105-*d*, an indication to transmit an SRS via the second set of antennas or antenna ports, and the UE 115-*d* may transmit, to the network entity 105-*d*, the SRS via the second set of antennas or antenna ports.

In some examples, the UE 115-*d* may transmit, to the network entity 105-*d*, an indication of a second switch of the second set of antennas or antenna ports from the first RAT back to the second RAT. In some examples, the UE 115-*d* may transmit the indication of the second switch via a HARQ-NACK feedback message or via a CSI report. In some examples, the network entity 105-*d* may receive, from the UE 115-*d*, a quantity of HARQ-NACK feedback message, and the network entity 105-*d* may identify a second switch of the second set of antennas or antenna ports from the first RAT back to the second RAT based on the quantity of HARQ-NACK feedback messages exceeding a threshold.

Figure 7:
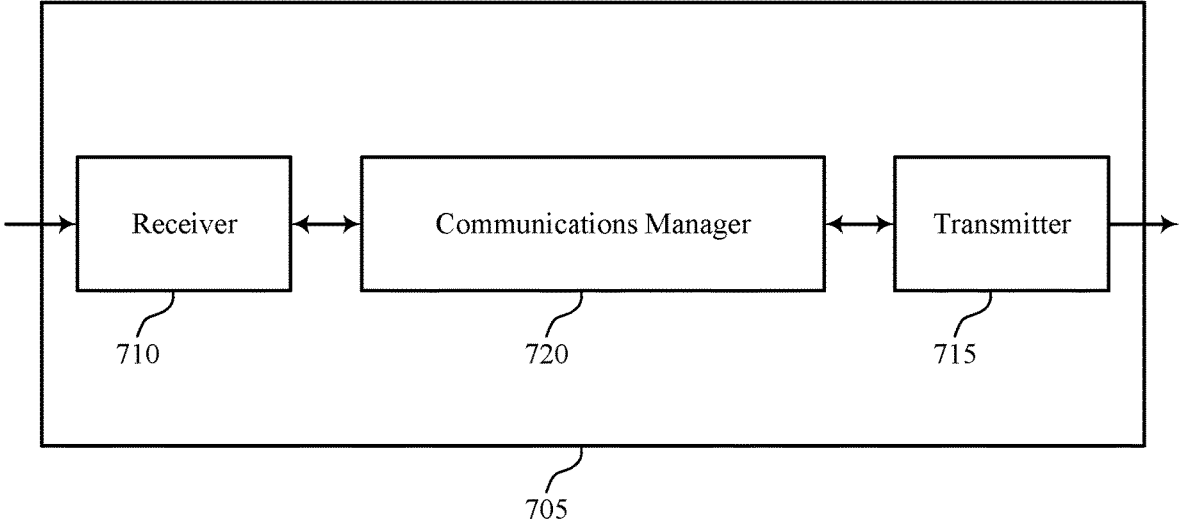
FIGS. 7 and 8 show block diagrams of devices that support antenna sharing between RATs in accordance with one or more aspects of the present disclosure.

FIG. 7 shows a block diagram 700 of a device 705 that supports antenna sharing between RATs in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to antenna sharing between RATs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to antenna sharing between RATs). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of antenna sharing between RATs as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 is capable of, configured to, or operable to support a means for communicating, on a frequency band and via a first set of antennas or antenna ports of the UE, using a first RAT for at least a first time period. The communications manager 720 is capable of, configured to, or operable to support a means for communicating, via a second set of antennas or antenna ports of the UE, using a second RAT for at least the first time period, where the second RAT is different from the first RAT. The communications manager 720 is capable of, configured to, or operable to support a means for transmitting, to a network entity associated with the first RAT, an indication of a capability of the UE to switch one or more antennas or antenna ports of the second set of antennas or antenna ports from the second RAT to the first RAT for communication on the frequency band for at least a second time period. The communications manager 720 is capable of, configured to, or operable to support a means for communicating, based at least in part on the indication of the capability of the UE, on the frequency band with the network entity via the first set of antennas or antenna ports and via the one or more antennas or antenna ports of the second set of antennas or antenna ports.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for more efficient utilization of communication resources.

Figure 8:
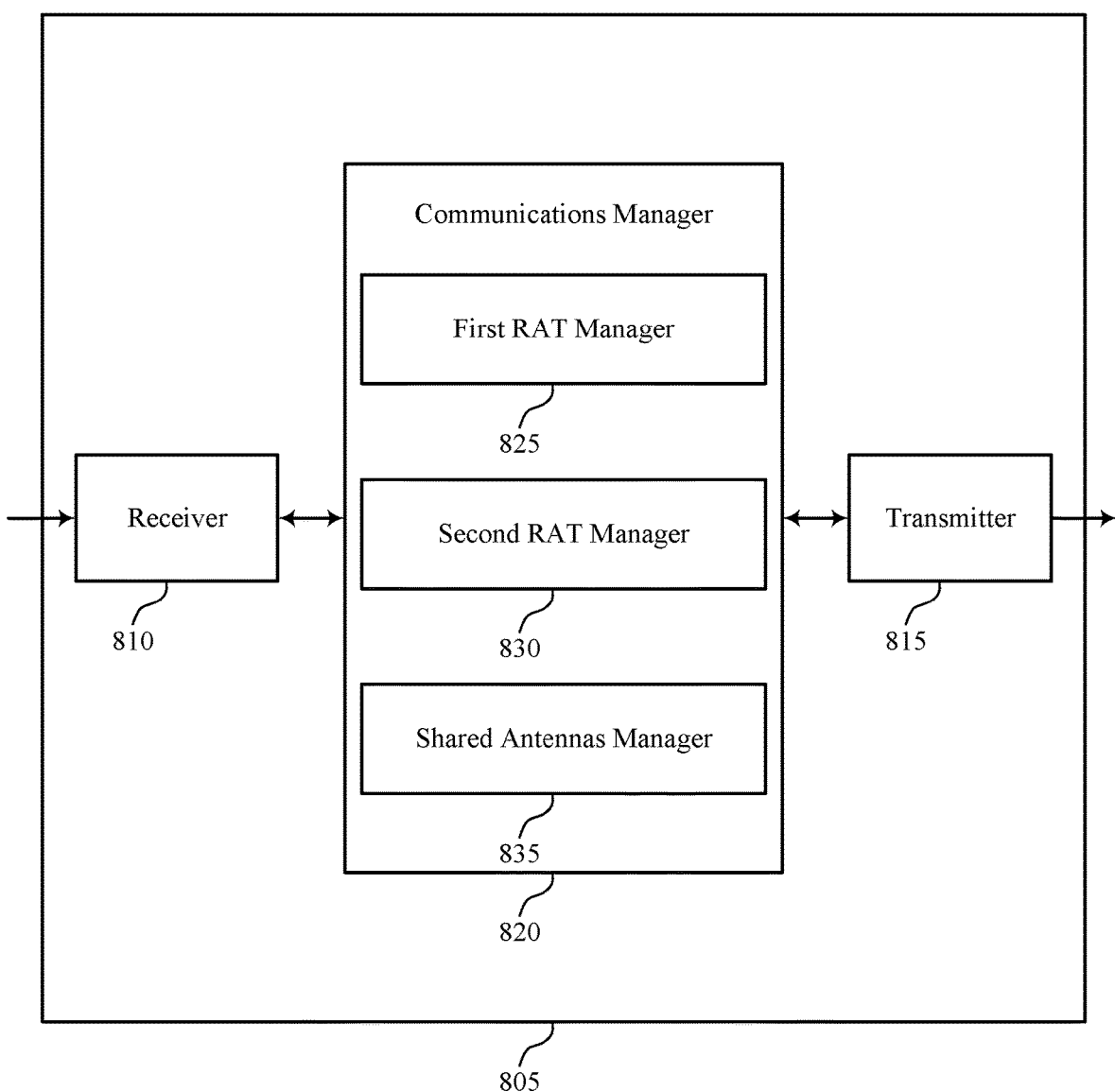

FIG. 8 shows a block diagram 800 of a device 805 that supports antenna sharing between RATs in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to antenna sharing between RATs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to antenna sharing between RATs). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of antenna sharing between RATs as described herein. For example, the communications manager 820 may include a first RAT manager 825, a second RAT manager 830, a shared antennas manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The first RAT manager 825 is capable of, configured to, or operable to support a means for communicating, on a frequency band and via a first set of antennas or antenna ports of the UE, using a first RAT for at least a first time period. The second RAT manager 830 is capable of, configured to, or operable to support a means for communicating, via a second set of antennas or antenna ports of the UE, using a second RAT for at least the first time period, where the second RAT is different from the first RAT. The shared antennas manager 835 is capable of, configured to, or operable to support a means for transmitting, to a network entity associated with the first RAT, an indication of a capability of the UE to switch one or more antennas or antenna ports of the second set of antennas or antenna ports from the second RAT to the first RAT for communication on the frequency band for at least a second time period. The first RAT manager 825 is capable of, configured to, or operable to support a means for communicating, based on the indication of the capability of the UE, on the frequency band with the network entity via the first set of antennas or antenna ports and via the one or more antennas or antenna ports of the second set of antennas or antenna ports.

Figure 9:
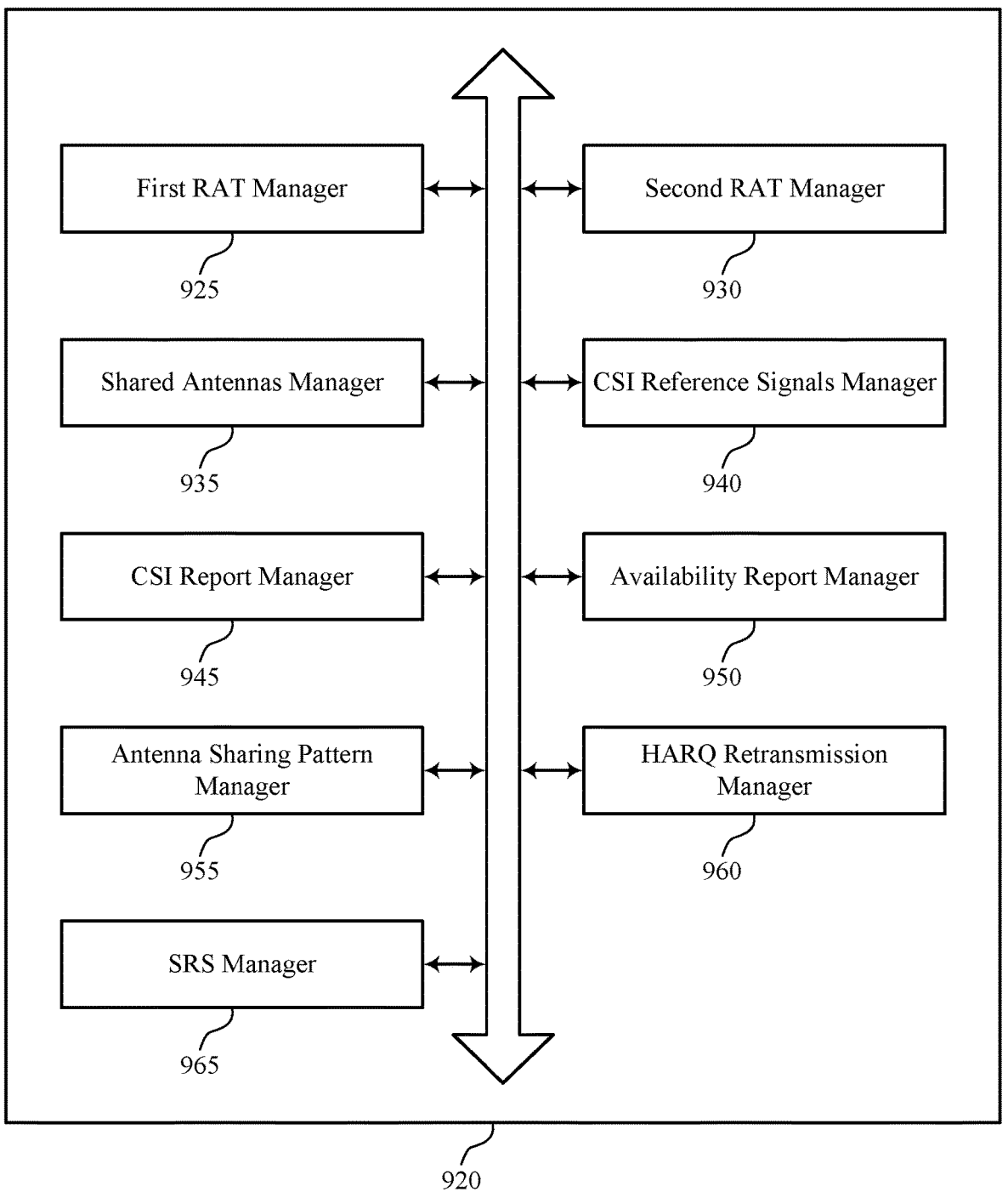
FIG. 9 shows a block diagram of a communications manager that supports antenna sharing between RATs in accordance with one or more aspects of the present disclosure.

FIG. 9 shows a block diagram 900 of a communications manager 920 that supports antenna sharing between RATs in accordance with one or more aspects of the present disclosure. The communications manager 920 may be an example of aspects of a communications manager 720, a communications manager 820, or both, as described herein. The communications manager 920, or various components thereof, may be an example of means for performing various aspects of antenna sharing between RATs as described herein. For example, the communications manager 920 may include a first RAT manager 925, a second RAT manager

930, a shared antennas manager 935, a CSI-RSs manager 940, a CSI report manager 945, an availability report manager 950, an antenna sharing pattern manager 955, an HARQ retransmission manager 960, an SRS manager 965, or any combination thereof. Each of these components may communicate, directly or indirectly, with one another (e.g., via one or more buses).

The communications manager 920 may support wireless communications at a UE in accordance with examples as disclosed herein. The first RAT manager 925 is capable of, configured to, or operable to support a means for communicating, on a frequency band and via a first set of antennas or antenna ports of the UE, using a first RAT for at least a first time period. The second RAT manager 930 is capable of, configured to, or operable to support a means for communicating, via a second set of antennas or antenna ports of the UE, using a second RAT for at least the first time period, where the second RAT is different from the first RAT. The shared antennas manager 935 is capable of, configured to, or operable to support a means for transmitting, to a network entity associated with the first RAT, an indication of a capability of the UE to switch one or more antennas or antenna ports of the second set of antennas or antenna ports from the second RAT to the first RAT for communication on the frequency band for at least a second time period. In some examples, the first RAT manager 925 is capable of, configured to, or operable to support a means for communicating, based on the indication of the capability of the UE, on the frequency band with the network entity via the first set of antennas or antenna ports and via the one or more antennas or antenna ports of the second set of antennas or antenna ports.

In some examples, to support transmitting the indication of the capability of the UE, the shared antennas manager 935 is capable of, configured to, or operable to support a means for transmitting an indication of a quantity of antennas or antenna ports of the second set of antennas or antenna ports available to switch from the second RAT to the first RAT for an uplink transmission or a downlink transmission.

In some examples, the transmitting the indication of the capability of the UE is based on the second RAT being disabled, the second set of antennas or antenna ports having no scheduled traffic, or a subset of the second set of antennas or antenna ports having no scheduled traffic.

In some examples, to support communicating with the network entity, the CSI-RSs manager 940 is capable of, configured to, or operable to support a means for receiving a set of CSI-RSs via the first set of antennas or antenna ports and via the second set of antennas or antenna ports. In some examples, to support communicating with the network entity, the CSI report manager 945 is capable of, configured to, or operable to support a means for transmitting a CSI report based on the set of CSI-RSs.

In some examples, the shared antennas manager 935 is capable of, configured to, or operable to support a means for receiving an indication of a quantity of antennas or antenna ports of the second set of antennas or antenna ports to switch from the second RAT to the first RAT for reception of the CSI-RSs.

In some examples, the shared antennas manager 935 is capable of, configured to, or operable to support a means for determining a quantity of antennas or antenna ports of the second set of antennas or antenna ports to switch from the second RAT to the first RAT for reception of the set of CSI-RSs. In some examples, the CSI report manager 945 is capable of, configured to, or operable to support a means for transmitting, with the CSI report, an indication of the quantity of antennas or antenna ports.

In some examples, receiving a request for an availability report of the capability of the UE to switch the second set of antennas or antenna ports from the second RAT to the first RAT. In some examples, transmitting the availability report of the capability of the UE to switch the second set of antennas or antenna ports from the second RAT to the first RAT.

In some examples, the shared antennas manager 935 is capable of, configured to, or operable to support a means for transmitting, to the network entity, an indication of a second switch of the one or more antennas or antenna ports of the second set of antennas or antenna ports from the first RAT back to the second RAT.

In some examples, to support transmitting the indication of the second switch, the shared antennas manager 935 is capable of, configured to, or operable to support a means for transmitting, the indication of the second switch via a HARQ-NACK feedback message or via a CSI report.

In some examples, to support transmitting the indication of the capability of the UE, the antenna sharing pattern manager 955 is capable of, configured to, or operable to support a means for transmitting an antenna sharing pattern indicating a quantity of antennas or antenna ports of the second set of antennas or antenna ports available to switch from the second RAT to the first RAT for each time slot of a set of time slots.

In some examples, to support transmitting the indication of the capability of the UE, the antenna sharing pattern manager 955 is capable of, configured to, or operable to support a means for transmitting an antenna sharing pattern indicating a quantity of antennas or antenna ports of first set of antennas or antenna ports and a quantity of antennas or antenna ports of the second set of antennas or antenna ports available to switch from the second RAT to the first RAT for each time slot of a set of time slots.

In some examples, to support communicating with the network entity, the first RAT manager 925 is capable of, configured to, or operable to support a means for receiving a transmission via a first quantity of the first set of antennas or antenna ports and a second quantity of the second set of antennas or antenna ports. In some examples, to support communicating with the network entity, the HARQ retransmission manager 960 is capable of, configured to, or operable to support a means for transmitting a HARQ retransmission in a time slot having available the first quantity of the first set of antennas or antenna ports and the second quantity of the second set of antennas or antenna ports.

In some examples, to support communicating with the network entity, the first RAT manager 925 is capable of, configured to, or operable to support a means for receiving a transmission via a first quantity of the first set of antennas or antenna ports and a second quantity of the second set of antennas or antenna ports. In some examples, to support communicating with the network entity, the HARQ retransmission manager 960 is capable of, configured to, or operable to support a means for transmitting a HARQ retransmission in a time slot having available the first quantity of the first set of antennas or antenna ports.

In some examples, to support communicating with the network entity, the SRS manager 965 is capable of, configured to, or operable to support a means for receiving an indication to transmit an SRS via the second set of antennas or antenna ports. In some examples, to support communicating with the network entity, the SRS manager 965 is capable of, configured to, or operable to support a means for transmitting the SRS via the second set of antennas or antenna ports.

In some examples, to support transmitting the indication of the capability of the UE, the first RAT manager 925 is capable of, configured to, or operable to support a means for transmitting an indication of a quantity of antennas or antenna ports dedicated for the first RAT.

Figure 10:
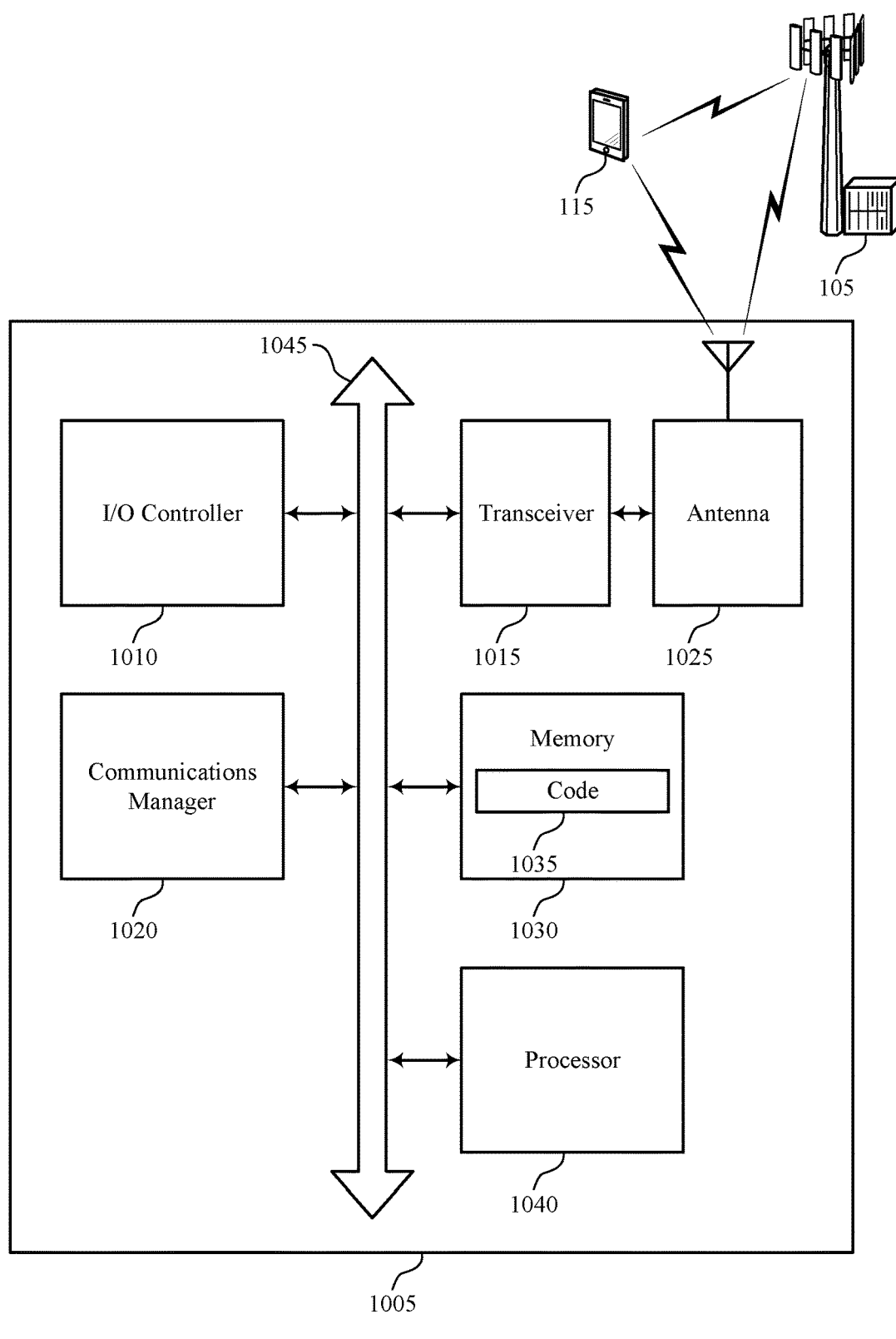
FIG. 10 shows a diagram of a system including a device that supports antenna sharing between RATs in accordance with one or more aspects of the present disclosure.

FIG. 10 shows a diagram of a system 1000 including a device 1005 that supports antenna sharing between RATs in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting antenna sharing between RATs). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 is capable of, configured to, or operable to support a means for communicating, on a frequency band and via a first set of antennas or antenna ports of the UE, using a first RAT for at least a first time period. The communications manager 1020 is capable of, configured to, or operable to support a means for communicating, via a second set of antennas or antenna ports of the UE, using a second RAT for at least the first time period, where the second RAT is different from the first RAT. The communications manager 1020 is capable of, configured to, or operable to support a means for transmitting, to a network entity associated with the first RAT, an indication of a capability of the UE to switch one or more antennas or antenna ports of the second set of antennas or antenna ports from the second RAT to the first RAT for communication on the frequency band for at least a second time period. The communications manager 1020 is capable of, configured to, or operable to support a means for communicating, based at least in part on the indication of the capability of the UE, on the frequency band with the network entity via the first set of antennas or antenna ports and via the one or more antennas or antenna ports of the second set of antennas or antenna ports.

By including or configuring the communications manager 1020 in accordance with examples as described herein, the device 1005 may support techniques for improved communication reliability, reduced latency, more efficient utilization of communication resources, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of antenna sharing between RATs as described herein, or the processor 1040 and the memory 1030 may be otherwise configured to perform or support such operations.

Figure 11:
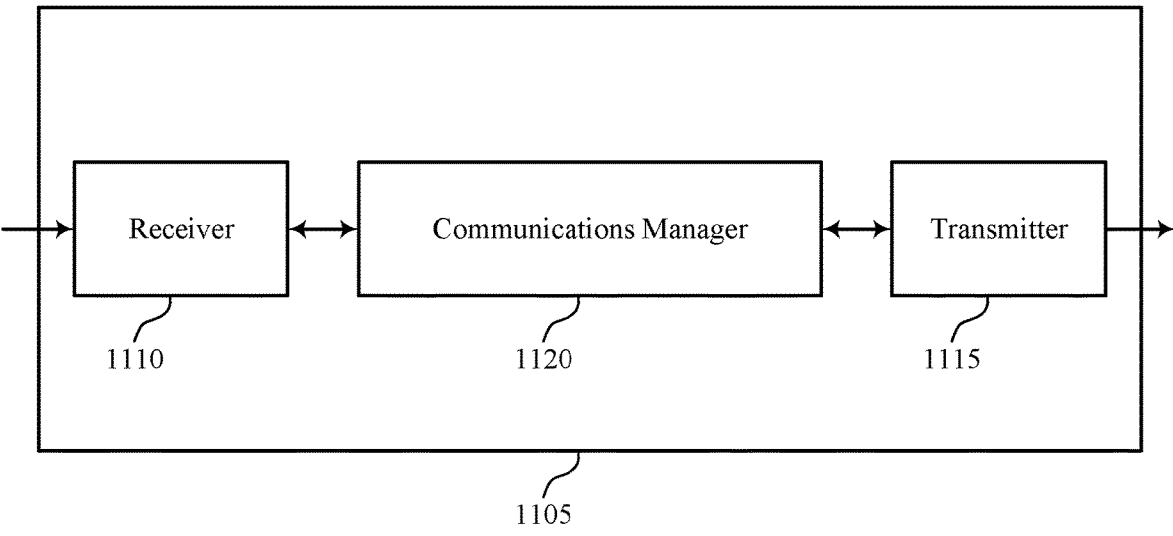
FIGS. 11 and 12 show block diagrams of devices that support antenna sharing between RATs in accordance with one or more aspects of the present disclosure.

FIG. 11 shows a block diagram 1100 of a device 1105 that supports antenna sharing between RATs in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of antenna sharing between RATs as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 is capable of, configured to, or operable to support a means for communicating, with a UE, on a frequency band and via a first set of antennas or antenna ports of the UE, using a first RAT for at least a first time period. The communications manager 1120 is capable of, configured to, or operable to support a means for receiving, from the UE, an indication of a capability of the UE to switch one or more antennas or antenna ports of a second set of antennas or antenna ports dedicated for a second RAT to the first RAT for communication on the frequency band for at least a second time period, where the second RAT is different from the first RAT. The communications manager 1120 is capable of, configured to, or operable to support a means for communicating, based at least in part on the indication of the capability of the UE, on the frequency band with the UE via the first set of antennas or antenna ports and via the one or more antennas or antenna ports of the second set of antennas or antenna ports.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for more efficient utilization of communication resources.

Figure 12:
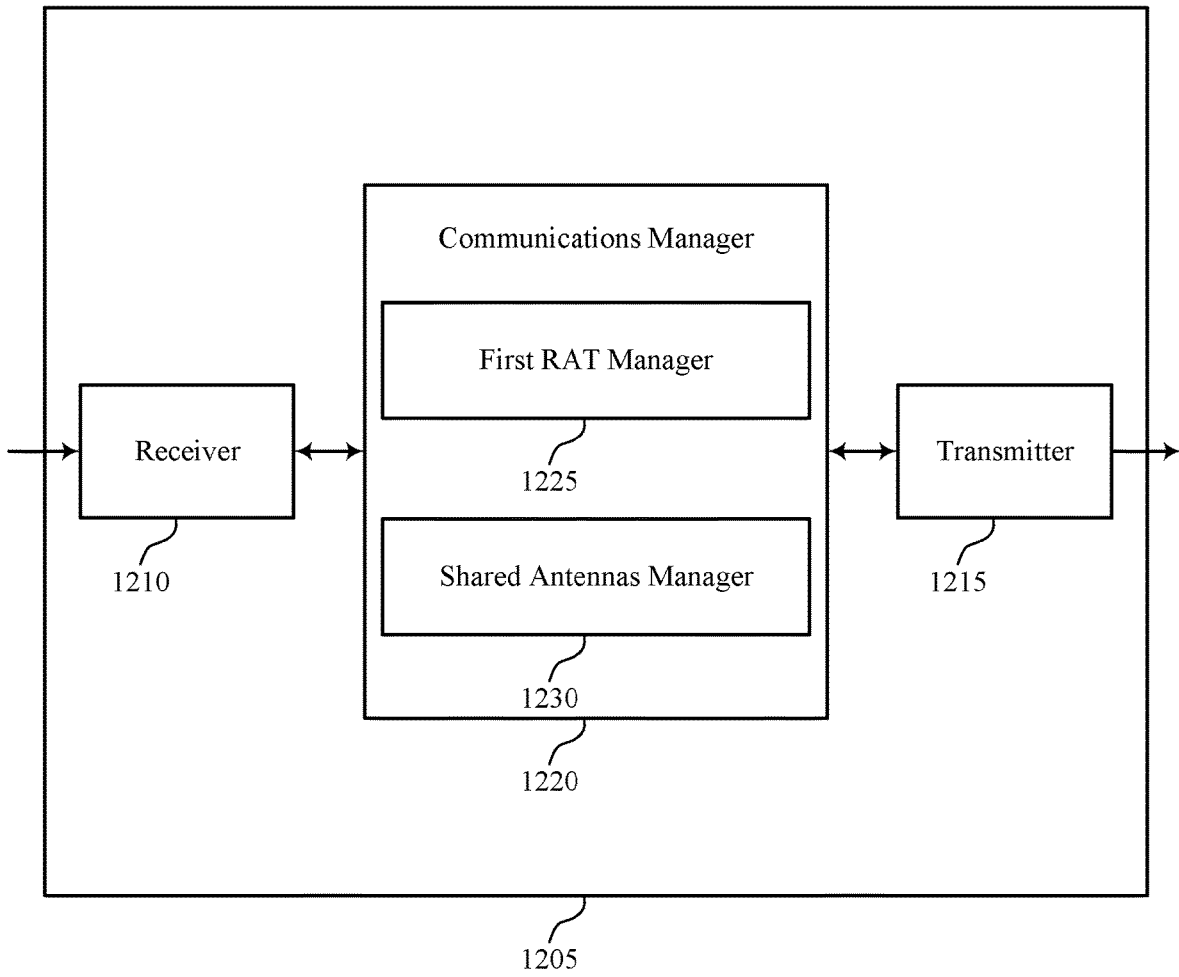
Figure 12:

FIG. 12 shows a block diagram 1200 of a device 1205 that supports antenna sharing between RATs in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of antenna sharing between RATs as described herein. For example, the communications manager 1220 may include a first RAT manager 1225 a shared antennas manager 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The first RAT manager 1225 is capable of, configured to, or operable to support a means for communicating, with a UE, on a frequency band and via a first set of antennas or antenna ports of the UE, using a first RAT for at least a first time period. The shared antennas manager 1230 is capable of, configured to, or operable to support a means for receiving, from the UE, an indication of a capability of the UE to switch one or more antennas or antenna ports of a second set of antennas or antenna ports dedicated for a second RAT to the first RAT for communication on the frequency band for at least a second time period, where the second RAT is different from the first RAT. The first RAT manager 1225 is capable of, configured to, or operable to support a means for communicating, based on the indication of the capability of the UE, on the frequency band with the UE via the first set of antennas or antenna ports and via the one or more antennas or antenna ports of the second set of antennas or antenna ports.

Figure 13:
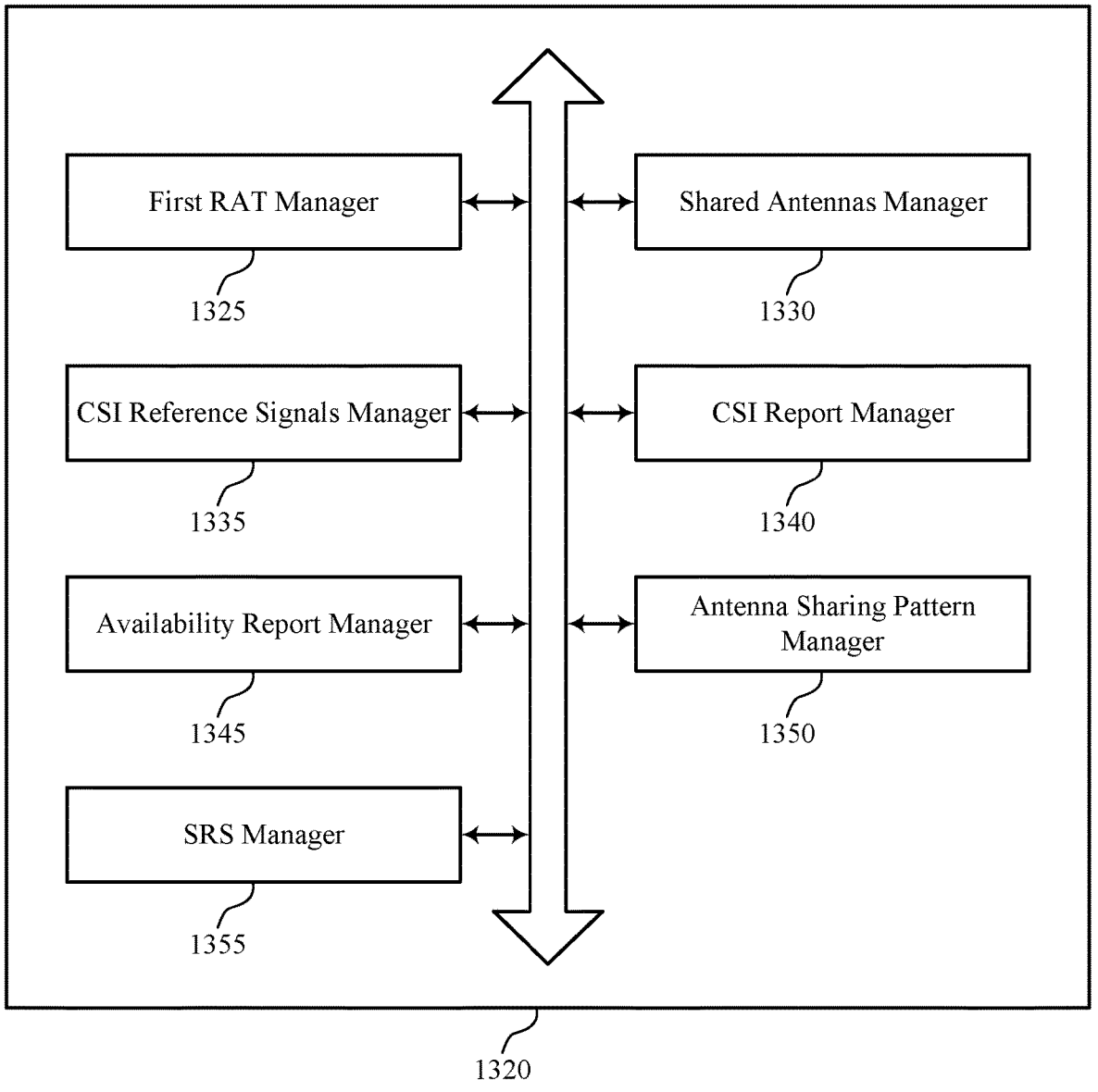
FIG. 13 shows a block diagram of a communications manager that supports antenna sharing between RATs in accordance with one or more aspects of the present disclosure.

FIG. 13 shows a block diagram 1300 of a communications manager 1320 that supports antenna sharing between RATs in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of antenna sharing between RATs as described herein. For example, the communications manager 1320 may include a first RAT manager 1325, a shared antennas manager 1330, a CSI-RSs manager 1335, a CSI report manager 1340, an availability report manager 1345, an antenna sharing pattern manager 1350, an SRS manager 1355, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The first RAT manager 1325 is capable of, configured to, or operable to support a means for communicating, with a UE, on a frequency band and via a first set of antennas or antenna ports of the UE, using a first RAT for at least a first time period. The shared antennas manager 1330 is capable of, configured to, or operable to support a means for receiving, from the UE, an indication of a capability of the UE to switch one or more antennas or antenna ports of a second set of antennas or antenna ports dedicated for a second RAT to the first RAT for communication on the frequency band for at least a second time period, where the second RAT is different from the first RAT. In some examples, the first RAT manager 1325 is capable of, configured to, or operable to support a means for communicating, based on the indication of the capability of the UE, on the frequency band with the UE via the first set of antennas or antenna ports and via the one or more antennas or antenna ports of the second set of antennas or antenna ports.

In some examples, to support receiving the indication of the capability of the UE, the shared antennas manager 1330 is capable of, configured to, or operable to support a means for receiving an indication of a quantity of antennas or antenna ports of the second set of antennas or antenna ports available to switch from the second RAT to the first RAT for an uplink transmission or a downlink transmission.

In some examples, to support communicating with the UE, the CSI-RSs manager 1335 is capable of, configured to, or operable to support a means for transmitting a set of CSI-RSs via the first set of antennas or antenna ports and via the second set of antennas or antenna ports. In some examples, to support communicating with the UE, the CSI report manager 1340 is capable of, configured to, or operable to support a means for receiving a CSI report.

In some examples, the shared antennas manager 1330 is capable of, configured to, or operable to support a means for transmitting an indication of a quantity of antennas or antenna ports of the second set of antennas or antenna ports to switch from the second RAT to the first RAT for reception of the CSI-RSs.

In some examples, to support communicating with the UE, the availability report manager 1345 is capable of, configured to, or operable to support a means for transmitting a request for an availability report of the capability of the UE to switch the second set of antennas or antenna ports from the second RAT to the first RAT. In some examples, to support communicating with the UE, the availability report manager 1345 is capable of, configured to, or operable to support a means for receiving the availability report of the capability of the UE to switch the second set of antennas or antenna ports from the second RAT to the first RAT.

In some examples, the shared antennas manager 1330 is capable of, configured to, or operable to support a means for receiving, from the UE, an indication of a second switch of the one or more antennas or antenna ports of the second set of antennas or antenna ports from the first RAT back to the second RAT.

In some examples, to support receiving the indication of the second switch, the shared antennas manager 1330 is capable of, configured to, or operable to support a means for receiving the indication of the second switch via a HARQ-NACK feedback message or via a CSI report.

In some examples, the first RAT manager 1325 is capable of, configured to, or operable to support a means for receiving, from the UE, a quantity of HARQ-NACK feedback messages. In some examples, the shared antennas manager 1330 is capable of, configured to, or operable to support a means for identifying a second switch of the second set of antennas or antenna ports from the first RAT back to the second RAT based on the quantity of HARQ-NACK feedback messages exceeding a threshold.

In some examples, to support receiving the indication of the capability of the UE, the antenna sharing pattern manager 1350 is capable of, configured to, or operable to support a means for receiving an antenna sharing pattern indicating a quantity of antennas or antenna ports of the second set of antennas or antenna ports available to switch from the second RAT to the first RAT for each time slot of a set of time slots.

In some examples, to support transmitting the indication of the capability of the UE, the antenna sharing pattern manager 1350 is capable of, configured to, or operable to support a means for receiving an antenna sharing pattern indicating a quantity of antennas or antenna ports of first set of antennas or antenna ports and a quantity of antennas or antenna ports of the second set of antennas or antenna ports available to switch from the second RAT to the first RAT for each time slot of a set of time slots.

In some examples, to support communicating with the UE, the SRS manager 1355 is capable of, configured to, or operable to support a means for transmitting an indication to transmit an SRS via the second set of antennas or antenna ports. In some examples, to support communicating with the UE, the SRS manager 1355 is capable of, configured to, or operable to support a means for receiving the SRS via the second set of antennas or antenna ports.

Figure 14:
FIG. 14 shows a diagram of a system including a device that supports antenna sharing between RATs in accordance with one or more aspects of the present disclosure.

FIG. 14 shows a diagram of a system 1400 including a device 1405 that supports antenna sharing between RATs in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting antenna sharing between RATs). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 is capable of, configured to, or operable to support a means for communicating, with a UE, on a frequency band and via a first set of antennas or antenna ports of the UE, using a first RAT for at least a first time period. The communications manager 1420 is capable of, configured to, or operable to support a means for receiving, from the UE, an indication of a capability of the UE to switch one or more antennas or antenna ports of a second set of antennas or antenna ports dedicated for a second RAT to the first RAT for communication on the frequency band for at least a second time period, where the second RAT is different from the first RAT. The communications manager 1420 is capable of, configured to, or operable to support a means for communicating, based at least in part on the indication of the capability of the UE, on the frequency band with the UE via the first set of antennas or antenna ports and via the one or more antennas or antenna ports of the second set of antennas or antenna ports.

By including or configuring the communications manager 1420 in accordance with examples as described herein, the device 1405 may support techniques for improved communication reliability, reduced latency, more efficient utilization of communication resources, and improved coordination between devices.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of antenna sharing between RATs as described herein, or the processor 1435 and the memory 1425 may be otherwise configured to perform or support such operations.

FIG. 15 shows a flowchart illustrating a method 1500 that supports antenna sharing between RATs in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the wireless UE to perform the described functions. Additionally, or alternatively, the wireless UE may perform aspects of the described functions using special-purpose hardware.

At 1505, the method may include communicating, on a frequency band and via a first set of antennas or antenna ports of the UE, using a first RAT for at least a first time period. The operations of 1505 may be performed in accordance with examples as disclosed herein. In some examples, aspects of the operations of 1505 may be performed by a first RAT manager 925 as described with reference to FIG. 9.

At 1510, the method may include communicating, via a second set of antennas or antenna ports of the UE, using a second RAT for at least the first time period, where the second RAT is different from the first RAT. The operations of 1510 may be performed in accordance with examples as disclosed herein. In some examples, aspects of the operations of 1510 may be performed by a second RAT manager 930 as described with reference to FIG. 9.

At 1515, the method may include transmitting, to a network entity associated with the first RAT, an indication of a capability of the UE to switch one or more antennas or antenna ports of the second set of antennas or antenna ports from the second RAT to the first RAT for communication on the frequency band for at least a second time period. The operations of 1515 may be performed in accordance with examples as disclosed herein. In some examples, aspects of the operations of 1515 may be performed by a shared antennas manager 935 as described with reference to FIG. 9.

At 1520, the method may include communicating, based on the indication of the capability of the UE, on the frequency band with the network entity via the first set of antennas or antenna ports and via the one or more antennas or antenna ports of the second set of antennas or antenna ports. The operations of 1520 may be performed in accordance with examples as disclosed herein. In some examples, aspects of the operations of 1520 may be performed by a first RAT manager 925 as described with reference to FIG. 9.

FIG. 16 shows a flowchart illustrating a method 1600 that supports antenna sharing between RATs in accordance with aspects of the present disclosure. The operations of the method 1600 may be implemented by a network entity or its components as described herein. For example, the operations of the method 1600 may be performed by a network entity as described with reference to FIGS. 1 through 6 and 11 through 14. In some examples, a network entity may execute a set of instructions to control the functional elements of the wireless network entity to perform the described functions. Additionally, or alternatively, the wireless network entity may perform aspects of the described functions using special-purpose hardware.

At 1605, the method may include communicating, with a UE, on a frequency band and via a first set of antennas or antenna ports of the UE, using a first RAT for at least a first time period. The operations of 1605 may be performed in accordance with examples as disclosed herein. In some examples, aspects of the operations of 1605 may be performed by a first RAT manager 1325 as described with reference to FIG. 13.

At 1610, the method may include receiving, from the UE, an indication of a capability of the UE to switch one or more antennas or antenna ports of a second set of antennas or antenna ports dedicated for a second RAT to the first RAT for communication on the frequency band for at least a second time period, where the second RAT is different from the first RAT. The operations of 1610 may be performed in accordance with examples as disclosed herein. In some examples, aspects of the operations of 1610 may be performed by a shared antennas manager 1330 as described with reference to FIG. 13.

At 1615, the method may include communicating, based on the indication of the capability of the UE, on the frequency band with the UE via the first set of antennas or antenna ports and via the one or more antennas or antenna ports of the second set of antennas or antenna ports. The operations of 1615 may be performed in accordance with examples as disclosed herein. In some examples, aspects of the operations of 1615 may be performed by a first RAT manager 1325 as described with reference to FIG. 13.

The following provides an overview of aspects of the present disclosure:

Aspect 1: A method for wireless communications at a UE, comprising: communicating, on a frequency band and via a first set of antennas or antenna ports of the UE, using a first radio access technology for at least a first time period; communicating, via a second set of antennas or antenna ports of the UE, using a second radio access technology for at least the first time period, wherein the second radio access technology is different from the first radio access technology; transmitting, to a network entity associated with the first radio access technology, an indication of a capability of the UE to switch one or more antennas or antenna ports of the second set of antennas or antenna ports from the second radio access technology to the first radio access technology for communication on the frequency band for at least a second time period; and communicating, based at least in part on the indication of the capability of the UE, on the frequency band with the network entity via the first set of antennas or antenna ports and via the one or more antennas or antenna ports of the second set of antennas or antenna ports.

Aspect 2: The method of aspect 1, wherein transmitting the indication of the capability of the UE comprises: transmitting an indication of a quantity of antennas or antenna ports of the second set of antennas or antenna ports available to switch from the second radio access technology to the first radio access technology for an uplink transmission or a downlink transmission.

Aspect 3: The method of any of aspects 1 through 2, wherein the transmitting the indication of the capability of the UE is based at least in part on the second radio access technology being disabled, the second set of antennas or antenna ports having no scheduled traffic, or a subset of the second set of antennas or antenna ports having no scheduled traffic.

Aspect 4: The method of any of aspects 1 through 3, wherein communicating with the network entity comprises: receiving a set of channel state information reference signals via the first set of antennas or antenna ports and via the second set of antennas or antenna ports, and transmitting a channel state information report based on the set of channel state information reference signals.

Aspect 5: The method of aspect 4, further comprising: receiving an indication of a quantity of antennas or antenna ports of the second set of antennas or antenna ports to switch from the second radio access technology to the first radio access technology for reception of the channel state information reference signals.

Aspect 6: The method of aspect 4, further comprising: determining a quantity of antennas or antenna ports of the second set of antennas or antenna ports to switch from the second radio access technology to the first radio access technology for reception of the set of channel state information reference signals; and transmitting, with the channel state information report, an indication of the quantity of antennas or antenna ports.

Aspect 7: The method of any of aspects 1 through 6, wherein communicating with the network entity comprising receiving a request for an availability report of the capability of the UE to switch the second set of antennas or antenna ports from the second radio access technology to the first radio access technology; and transmitting the availability report of the capability of the UE to switch the second set of antennas or antenna ports from the second radio access technology to the first radio access technology.

Aspect 8: The method of any of aspects 1 through 7, further comprising: transmitting, to the network entity, an indication of a second switch of the one or more antennas or antenna ports of the second set of antennas or antenna ports from the first radio access technology back to the second radio access technology.

Aspect 9: The method of aspect 8, wherein the transmitting the indication of the second switch comprises: transmitting, the indication of the second switch via a hybrid automatic repeat request negative acknowledgment feedback message or via a channel state information report.

Aspect 10: The method of any of aspects 1 through 9, wherein transmitting the indication of the capability of the UE comprises: transmitting an antenna sharing pattern indicating a quantity of antennas or antenna ports of the second set of antennas or antenna ports available to switch from the second radio access technology to the first radio access technology for each time slot of a set of time slots.

Aspect 11: The method of any of aspects 1 through 10, wherein transmitting the indication of the capability of the UE comprises: transmitting an antenna sharing pattern indicating a quantity of antennas or antenna ports of first set of antennas or antenna ports and a quantity of antennas or antenna ports of the second set of antennas or antenna ports available to switch from the second radio access technology to the first radio access technology for each time slot of a set of time slots.

Aspect 12: The method of any of aspects 1 through 11, wherein communicating with the network entity comprises: receiving a transmission via a first quantity of the first set of antennas or antenna ports and a second quantity of the second set of antennas or antenna ports; and transmitting a hybrid automatic repeat request retransmission in a time slot having available the first quantity of the first set of antennas or antenna ports and the second quantity of the second set of antennas or antenna ports.

Aspect 13: The method of any of aspects 1 through 12, wherein communicating with the network entity comprises: receiving a transmission via a first quantity of the first set of antennas or antenna ports and a second quantity of the second set of antennas or antenna ports; and transmitting a hybrid automatic repeat request retransmission in a time slot having available the first quantity of the first set of antennas or antenna ports.

Aspect 14: The method of any of aspects 1 through 13, wherein communicating with the network entity comprises: receiving an indication to transmit a sounding reference signal via the second set of antennas or antenna ports; and transmitting the sounding reference signal via the second set of antennas or antenna ports.

Aspect 15: The method of any of aspects 1 through 14, wherein transmitting the indication of the capability of the UE comprises: transmitting an indication of a quantity of antennas or antenna ports dedicated for the first radio access technology.

Aspect 16: A method for wireless communications at a network entity, comprising: communicating, with a UE, on a frequency band and via a first set of antennas or antenna ports of the UE, using a first radio access technology for at least a first time period; receiving, from the UE, an indication of a capability of the UE to switch one or more antennas or antenna ports of a second set of antennas or antenna ports dedicated for a second radio access technology to the first radio access technology for communication on the frequency band for at least a second time period, wherein the second radio access technology is different from the first radio access technology; and communicating, based at least in part on the indication of the capability of the UE, on the frequency band with the UE via the first set of antennas or antenna ports and via the one or more antennas or antenna ports of the second set of antennas or antenna ports.

Aspect 17: The method of aspect 16, wherein receiving the indication of the capability of the UE comprises: receiving an indication of a quantity of antennas or antenna ports of the second set of antennas or antenna ports available to switch from the second radio access technology to the first radio access technology for an uplink transmission or a downlink transmission.

Aspect 18: The method of any of aspects 16 through 17, wherein communicating with the UE comprises: transmitting a set of channel state information reference signals via the first set of antennas or antenna ports and via the second set of antennas or antenna ports, and receiving a channel state information report.

Aspect 19: The method of aspect 18, further comprising: transmitting an indication of a quantity of antennas or antenna ports of the second set of antennas or antenna ports to switch from the second radio access technology to the first radio access technology for reception of the channel state information reference signals.

Aspect 20: The method of any of aspects 16 through 19, wherein communicating with the UE comprises: transmitting a request for an availability report of the capability of the UE to switch the second set of antennas or antenna ports from the second radio access technology to the first radio access technology; and receiving the availability report of the capability of the UE to switch the second set of antennas or antenna ports from the second radio access technology to the first radio access technology.

Aspect 21: The method of any of aspects 16 through 20, further comprising: receiving, from the UE, an indication of a second switch of the one or more antennas or antenna ports of the second set of antennas or antenna ports from the first radio access technology back to the second radio access technology.

Aspect 22: The method of aspect 21, wherein the receiving the indication of the second switch comprises: receiving the indication of the second switch via a hybrid automatic repeat request negative acknowledgment feedback message or via a channel state information report.

Aspect 23: The method of any of aspects 16 through 22, further comprising: receiving, from the UE, a quantity of hybrid automatic repeat request negative acknowledgment feedback messages; and identifying a second switch of the second set of antennas or antenna ports from the first radio access technology back to the second radio access technology based on the quantity of hybrid automatic repeat request negative acknowledgment feedback messages exceeding a threshold.

Aspect 24: The method of any of aspects 16 through 23, wherein receiving the indication of the capability of the UE comprises: receiving an antenna sharing pattern indicating a quantity of antennas or antenna ports of the second set of antennas or antenna ports available to switch from the second radio access technology to the first radio access technology for each time slot of a set of time slots.

Aspect 25: The method of any of aspects 16 through 24, wherein transmitting the indication of the capability of the UE comprises: receiving an antenna sharing pattern indicating a quantity of antennas or antenna ports of first set of antennas or antenna ports and a quantity of antennas or antenna ports of the second set of antennas or antenna ports available to switch from the second radio access technology to the first radio access technology for each time slot of a set of time slots.

Aspect 26: The method of any of aspects 16 through 25, wherein communicating with the UE comprises: transmitting an indication to transmit a sounding reference signal via the second set of antennas or antenna ports; and receiving the sounding reference signal via the second set of antennas or antenna ports.

Aspect 27: An apparatus for wireless communications at a UE, comprising a processor; memory coupled with the processor; and instructions stored in the memory and executable by the processor to cause the apparatus to perform a method of any of aspects 1 through 15.

Aspect 28: An apparatus for wireless communications at a UE, comprising at least one means for performing a method of any of aspects 1 through 15.

Aspect 29: A non-transitory computer-readable medium storing code for wireless communications at a UE, the code comprising instructions executable by a processor to perform a method of any of aspects 1 through 15.

Aspect 30: An apparatus for wireless communications at a network entity, comprising a processor; memory coupled with the processor; and instructions stored in the memory and executable by the processor to cause the apparatus to perform a method of any of aspects 16 through 26.

Aspect 31: An apparatus for wireless communications at a network entity, comprising at least one means for performing a method of any of aspects 16 through 26.

Aspect 32: A non-transitory computer-readable medium storing code for wireless communications at a network entity, the code comprising instructions executable by a processor to perform a method of any of aspects 16 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

one or more memories storing instructions; and one or more processors coupled with the one or more memories and operable to cause the apparatus to:

communicate, on a frequency band and via a first set of antennas or antenna ports of the UE, using a first radio access technology for at least a first time period;

communicate, via a second set of antennas or antenna ports of the UE, using a second radio access technology for at least the first time period, wherein the second radio access technology is different from the first radio access technology;

transmit, to a network entity associated with the first radio access technology, an indication of a capability of the UE to switch one or more antennas or antenna ports of the second set of antennas or antenna ports from the second radio access technology to the first radio access technology for communication on the frequency band for at least a second time period, wherein transmission of the indication is based on the second set of antennas or antenna ports having no scheduled traffic or a subset of the second set of antennas or antenna ports having no scheduled traffic; and communicate, based at least in part on the indication of the capability of the UE, on the frequency band with the network entity via the first set of antennas or antenna ports and via the one or more antennas or antenna ports of the second set of antennas or antenna ports.

2. The apparatus of claim 1, wherein, to transmit the indication of the capability of the UE, the one or more processors are operable to cause the apparatus to:

transmit an indication of a quantity of antennas or antenna ports of the second set of antennas or antenna ports available to switch from the second radio access technology to the first radio access technology for an uplink transmission or a downlink transmission.

3. The apparatus of claim 1, wherein, to communicate with the network entity, the one or more processors are operable to cause the apparatus to:

receive a set of channel state information reference signals via the first set of antennas or antenna ports and via the second set of antennas or antenna ports, and transmit a channel state information report based on the set of channel state information reference signals.

4. The apparatus of claim 3, wherein the one or more processors are further operable to cause the apparatus to:

receive an indication of a quantity of antennas or antenna ports of the second set of antennas or antenna ports to switch from the second radio access technology to the first radio access technology for reception of the set of channel state information reference signals.

5. The apparatus of claim 3, wherein the one or more processors are further operable to cause the apparatus to:

determine a quantity of antennas or antenna ports of the second set of antennas or antenna ports to switch from the second radio access technology to the first radio access technology for reception of the set of channel state information reference signals; and transmit, with the channel state information report, an indication of the quantity of antennas or antenna ports.

6. The apparatus of claim 1, wherein, to communicate with the network entity, the one or more processors are operable to cause the apparatus to:

receive a request for an availability report of the capability of the UE to switch the second set of antennas or antenna ports from the second radio access technology to the first radio access technology; and transmit the availability report of the capability of the UE to switch the second set of antennas or antenna ports from the second radio access technology to the first radio access technology.

7. The apparatus of claim 1, wherein the one or more processors are further operable to cause the apparatus to:

transmit, to the network entity, an indication of a second switch of the one or more antennas or antenna ports of the second set of antennas or antenna ports from the first radio access technology back to the second radio access technology.

8. The apparatus of claim 7, wherein, to transmit the indication of the second switch, the one or more processors are operable to cause the apparatus to:

transmit, the indication of the second switch via a hybrid automatic repeat request negative acknowledgment feedback message or via a channel state information report.

9. The apparatus of claim 1, wherein, to transmit the indication of the capability of the UE, the one or more processors are operable to cause the apparatus to:

transmit an antenna sharing pattern indicating a quantity of antennas or antenna ports of the second set of antennas or antenna ports available to switch from the second radio access technology to the first radio access technology for each time slot of a set of time slots.

10. The apparatus of claim 1, wherein, to transmit the indication of the capability of the UE, the one or more processors are operable to cause the apparatus to:

transmit an antenna sharing pattern indicating a quantity of antennas or antenna ports of first set of antennas or antenna ports and a quantity of antennas or antenna ports of the second set of antennas or antenna ports available to switch from the second radio access technology to the first radio access technology for each time slot of a set of time slots.

11. The apparatus of claim 1, wherein, to communicate with the network entity, the one or more processors are operable to cause the apparatus to:

receive a transmission via a first quantity of the first set of antennas or antenna ports and a second quantity of the second set of antennas or antenna ports; and transmit a hybrid automatic repeat request retransmission in a time slot having available the first quantity of the first set of antennas or antenna ports and the second quantity of the second set of antennas or antenna ports.

12. The apparatus of claim 1, wherein, to communicate with the network entity, the one or more processors are operable to cause the apparatus to:

receive a transmission via a first quantity of the first set of antennas or antenna ports and a second quantity of the second set of antennas or antenna ports; and transmit a hybrid automatic repeat request retransmission in a time slot having available the first quantity of the first set of antennas or antenna ports.

13. The apparatus of claim 1, wherein, to communicate with the network entity, the one or more processors are operable to cause the apparatus to:

receive an indication to transmit a sounding reference signal via the second set of antennas or antenna ports; and transmit the sounding reference signal via the second set of antennas or antenna ports.

14. The apparatus of claim 1, wherein, to transmit the indication of the capability of the UE, the one or more processors are operable to cause the apparatus to:

transmit an indication of a quantity of antennas or antenna ports dedicated for the first radio access technology.

15. An apparatus for wireless communications at a network entity, comprising:

one or more memories storing instructions; and one or more processors coupled with the one or more memories and operable to cause the apparatus to:

communicate, with a user equipment (UE), on a frequency band and via a first set of antennas or antenna ports of the UE, used a first radio access technology for at least a first time period;

receive, from the UE, an indication of a capability of the UE to switch one or more antennas or antenna ports of a second set of antennas or antenna ports dedicated for a second radio access technology to the first radio access technology for communication on the frequency band for at least a second time period, wherein the second radio access technology is different from the first radio access technology, wherein the indication is based on the second set of antennas or antenna ports having no scheduled traffic or a subset of the second set of antennas or antenna ports having no scheduled traffic; and communicate, based at least in part on the indication of the capability of the UE, on the frequency band with the UE via the first set of antennas or antenna ports and via the one or more antennas or antenna ports of the second set of antennas or antenna ports.

16. The apparatus of claim 15, wherein, to receive the indication of the capability of the UE, the one or more processors are operable to cause the apparatus to:

receive an indication of a quantity of antennas or antenna ports of the second set of antennas or antenna ports available to switch from the second radio access technology to the first radio access technology for an uplink transmission or a downlink transmission.

17. The apparatus of claim 15, wherein, to communicate with the UE, the one or more processors are operable to cause the apparatus to:

transmit a set of channel state information reference signals via the first set of antennas or antenna ports and via the second set of antennas or antenna ports, and receive a channel state information report.

18. The apparatus of claim 17, wherein the one or more processors are further operable to cause the apparatus to:

transmit an indication of a quantity of antennas or antenna ports of the second set of antennas or antenna ports to switch from the second radio access technology to the first radio access technology for reception of the set of channel state information reference signals.

19. The apparatus of claim 15, wherein, to communicate with the UE, the one or more processors are operable to cause the apparatus to:

transmit a request for an availability report of the capability of the UE to switch the second set of antennas or antenna ports from the second radio access technology to the first radio access technology; and receive the availability report of the capability of the UE to switch the second set of antennas or antenna ports from the second radio access technology to the first radio access technology.

20. The apparatus of claim 15, wherein the one or more processors are further operable to cause the apparatus to:

receive, from the UE, an indication of a second switch of the one or more antennas or antenna ports of the second set of antennas or antenna ports from the first radio access technology back to the second radio access technology.

21. The apparatus of claim 20, wherein, to receive the indication of the second switch, the one or more processors are operable to cause the apparatus to:

receive the indication of the second switch via a hybrid automatic repeat request negative acknowledgment feedback message or via a channel state information report.

22. The apparatus of claim 15, wherein the one or more processors are further operable to cause the apparatus to:

receive, from the UE, a quantity of hybrid automatic repeat request negative acknowledgment feedback messages; and identify a second switch of the second set of antennas or antenna ports from the first radio access technology back to the second radio access technology based on the quantity of hybrid automatic repeat request negative acknowledgment feedback messages exceeding a threshold.

23. The apparatus of claim 15, wherein, to receive the indication of the capability of the UE, the one or more processors are operable to cause the apparatus to:

receive an antenna sharing pattern indicating a quantity of antennas or antenna ports of the second set of antennas or antenna ports available to switch from the second radio access technology to the first radio access technology for each time slot of a set of time slots.

24. The apparatus of claim 15, wherein, to transmit to receive the indication of the capability of the UE, the one or more processors are operable to cause the apparatus to:

receive an antenna sharing pattern indicating a quantity of antennas or antenna ports of first set of antennas or antenna ports and a quantity of antennas or antenna ports of the second set of antennas or antenna ports available to switch from the second radio access technology to the first radio access technology for each time slot of a set of time slots.

25. The apparatus of claim 15, wherein, to communicate with the UE, the one or more processors are operable to cause the apparatus to:

transmit an indication to transmit a sounding reference signal via the second set of antennas or antenna ports; and receive the sounding reference signal via the second set of antennas or antenna ports.

26. A method for wireless communications at a user equipment (UE), comprising:

communicating, on a frequency band and via a first set of antennas or antenna ports of the UE, using a first radio access technology for at least a first time period;

communicating, via a second set of antennas or antenna ports of the UE, using a second radio access technology for at least the first time period, wherein the second radio access technology is different from the first radio access technology;

transmitting, to a network entity associated with the first radio access technology, an indication of a capability of the UE to switch one or more antennas or antenna ports of the second set of antennas or antenna ports from the second radio access technology to the first radio access technology for communication on the frequency band for at least a second time period, wherein transmission of the indication is based on the second set of antennas or antenna ports having no scheduled traffic or a subset of the second set of antennas or antenna ports having no scheduled traffic; and communicating, based at least in part on the indication of the capability of the UE, on the frequency band with the network entity via the first set of antennas or antenna ports and via the one or more antennas or antenna ports of the second set of antennas or antenna ports.

27. The method of claim 26, wherein transmitting the indication of the capability of the UE comprises:

transmitting an indication of a quantity of antennas or antenna ports of the second set of antennas or antenna ports available to switch from the second radio access technology to the first radio access technology for an uplink transmission or a downlink transmission.

28. The method of claim 26, wherein communicating with the network entity comprising:

receiving a request for an availability report of the capability of the UE to switch the second set of antennas or antenna ports from the second radio access technology to the first radio access technology; and transmitting the availability report of the capability of the UE to switch the second set of antennas or antenna ports from the second radio access technology to the first radio access technology.

29. A method for wireless communications at a network entity, comprising:

communicating, with a user equipment (UE), on a frequency band and via a first set of antennas or antenna ports of the UE, using a first radio access technology for at least a first time period;

receiving, from the UE, an indication of a capability of the UE to switch one or more antennas or antenna ports of a second set of antennas or antenna ports dedicated for a second radio access technology to the first radio access technology for communication on the frequency band for at least a second time period, wherein the second radio access technology is different from the first radio access technology, wherein the indication is based on the second set of antennas or antenna ports having no scheduled traffic, or a subset of the second set of antennas or antenna ports having no scheduled traffic; and communicating, based at least in part on the indication of the capability of the UE, on the frequency band with the UE via the first set of antennas or antenna ports and via the one or more antennas or antenna ports of the second set of antennas or antenna ports.

\* \* \* \* \*